US008683121B2

(12) United States Patent
Tajima

(10) Patent No.: US 8,683,121 B2
(45) Date of Patent: Mar. 25, 2014

(54) STORAGE SYSTEM

(75) Inventor: Yuri Tajima, Tokyo (JP)

(73) Assignee: NEC Corporation, Tokyo (JP)

( * ) Notice: Subject to any disclaimer, the term of this patent is extended or adjusted under 35 U.S.C. 154(b) by 35 days.

(21) Appl. No.: 13/139,606

(22) PCT Filed: Aug. 20, 2009

(86) PCT No.: PCT/JP2009/003962
§ 371 (c)(1),
(2), (4) Date: Jun. 14, 2011

(87) PCT Pub. No.: WO2010/086922
PCT Pub. Date: Aug. 5, 2010

(65) Prior Publication Data
US 2011/0271050 A1    Nov. 3, 2011

(30) Foreign Application Priority Data

Jan. 27, 2009    (JP) .................................. 2009-015261

(51) Int. Cl.
*G06F 12/00* (2006.01)
*G06F 3/06* (2006.01)

(52) U.S. Cl.
USPC ................... 711/114; 711/154; 711/E12.019; 707/687; 707/E17.001

(58) Field of Classification Search
None
See application file for complete search history.

(56) References Cited

U.S. PATENT DOCUMENTS 7,159,150 B2 *   1/2007  Kenchammana-Hosekote et al. ............................... 714/43
7,734,603 B1 *   6/2010  McManis ....................... 707/696
2002/0010679 A1 *   1/2002  Felsher ............................ 705/51
2004/0049700 A1 *   3/2004  Yoshida ......................... 713/201
2005/0055521 A1 *   3/2005  Saika ............................. 711/162
2011/0313971 A1 * 12/2011  Hironaga et al. ............. 707/610
2012/0011338 A1 *   1/2012  Kobayashi .................... 711/162
2012/0311113 A1 * 12/2012  Nagata ........................... 709/221

FOREIGN PATENT DOCUMENTS

| CN | 1642066 A | 7/2005 |
|---|---|---|
| JP | 03-095620 A | 4/1991 |
| JP | 2001290681 A | 10/2001 |
| JP | 2005084771 A | 3/2005 |
| JP | 2005235171 A | 9/2005 |
| JP | 2009-524882 A | 7/2009 |
| WO | 2007059502 A | 8/2007 |

OTHER PUBLICATIONS

Japanese Office Action for JP Application No. 2009-015261 mailed on Jul. 2, 2013 with English Translation.

(Continued)

*Primary Examiner* — Matthew Bradley
*Assistant Examiner* — Daniel Bernard
(74) *Attorney, Agent, or Firm* — Sughrue Mion, PLLC

(57) ABSTRACT

A storage system includes: a plurality of storing means and a data processing means that stores data into the plurality of storing means and retrieves the data stored in the storing means. The data processing means includes: a data set generating means that generates division data by dividing storage target data into a plurality of pieces and also generates redundant data for restoring the storage target data, thereby generating a data set composed of a plurality of fragment data that are the division data and the redundant data; and a distribution storage controlling means that distributes and stores the fragment data into the respective storing means. The distribution storage controlling means stores the fragment data composing the data set in same positions within storage regions formed in the respective storing means, respectively.

10 Claims, 18 Drawing Sheets

(56) References Cited

OTHER PUBLICATIONS

Chinese Office Action for CN Application No. 200980154991.6 issued on Jun. 28, 2013 with English Translation.

International Search Report for PCT/JP2009/003962 mailed on Oct. 20, 2009.
The Extended European Search Report for EP 09839114.7 dated on Jun. 7, 2013.

\* cited by examiner

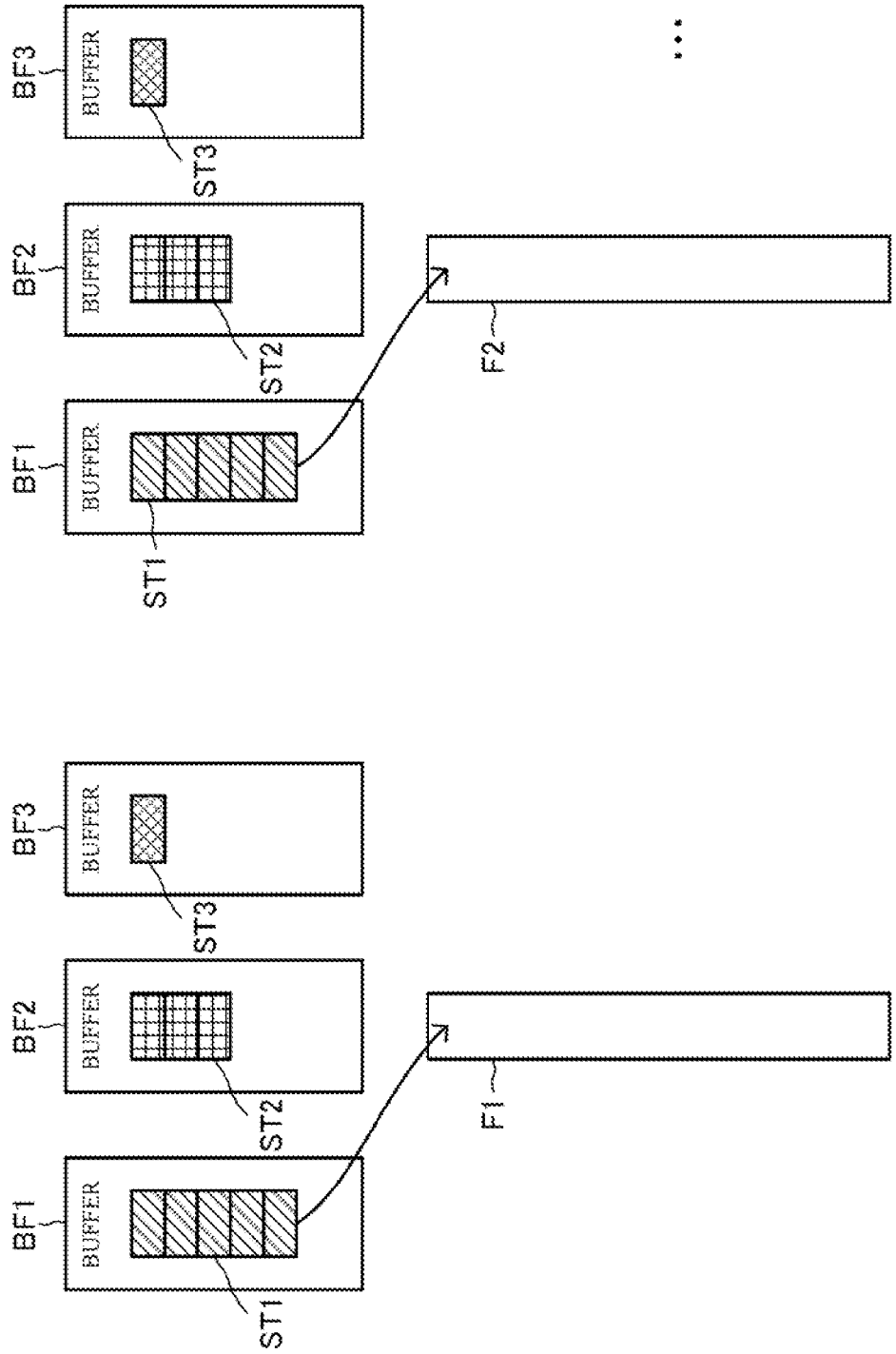

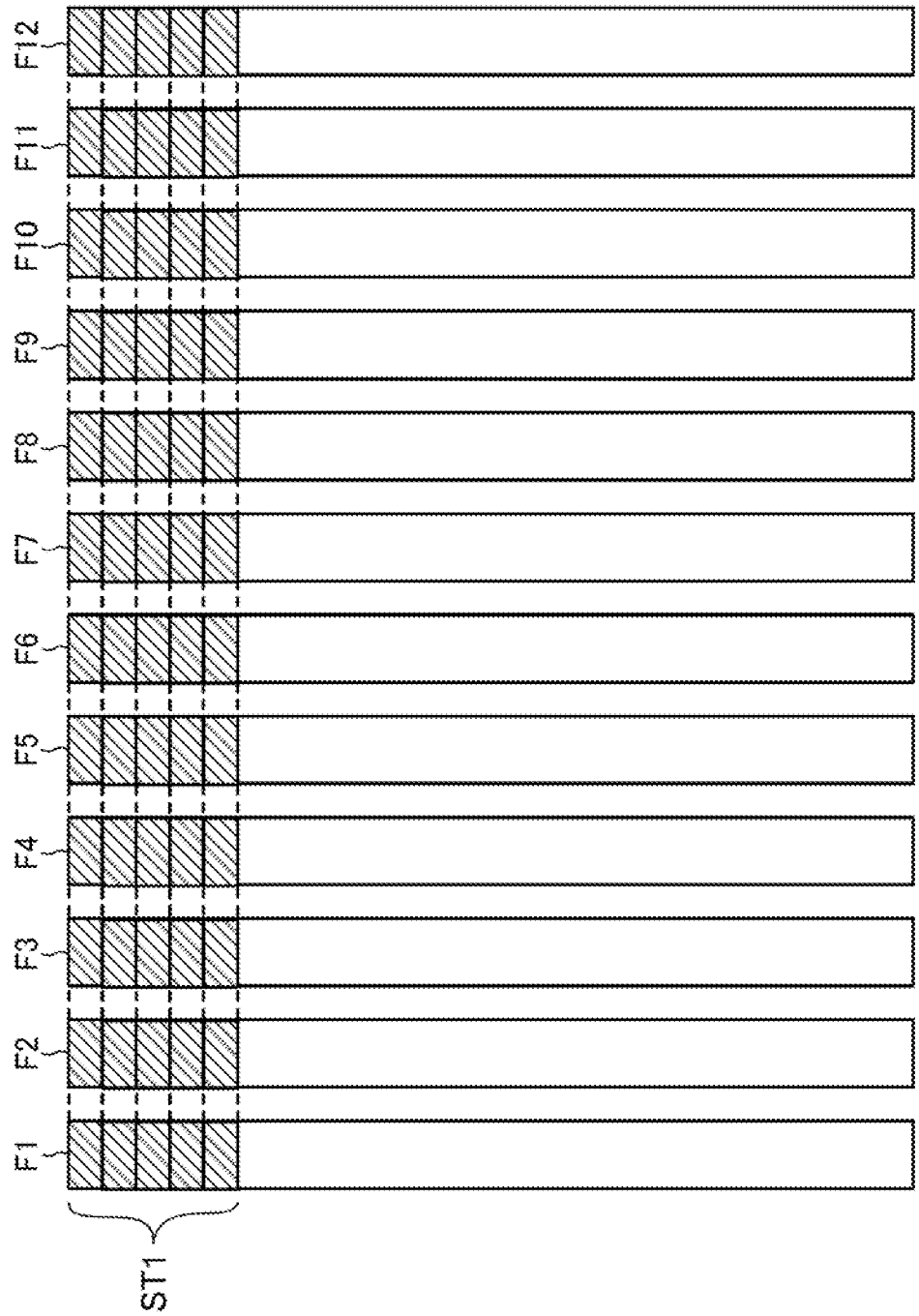

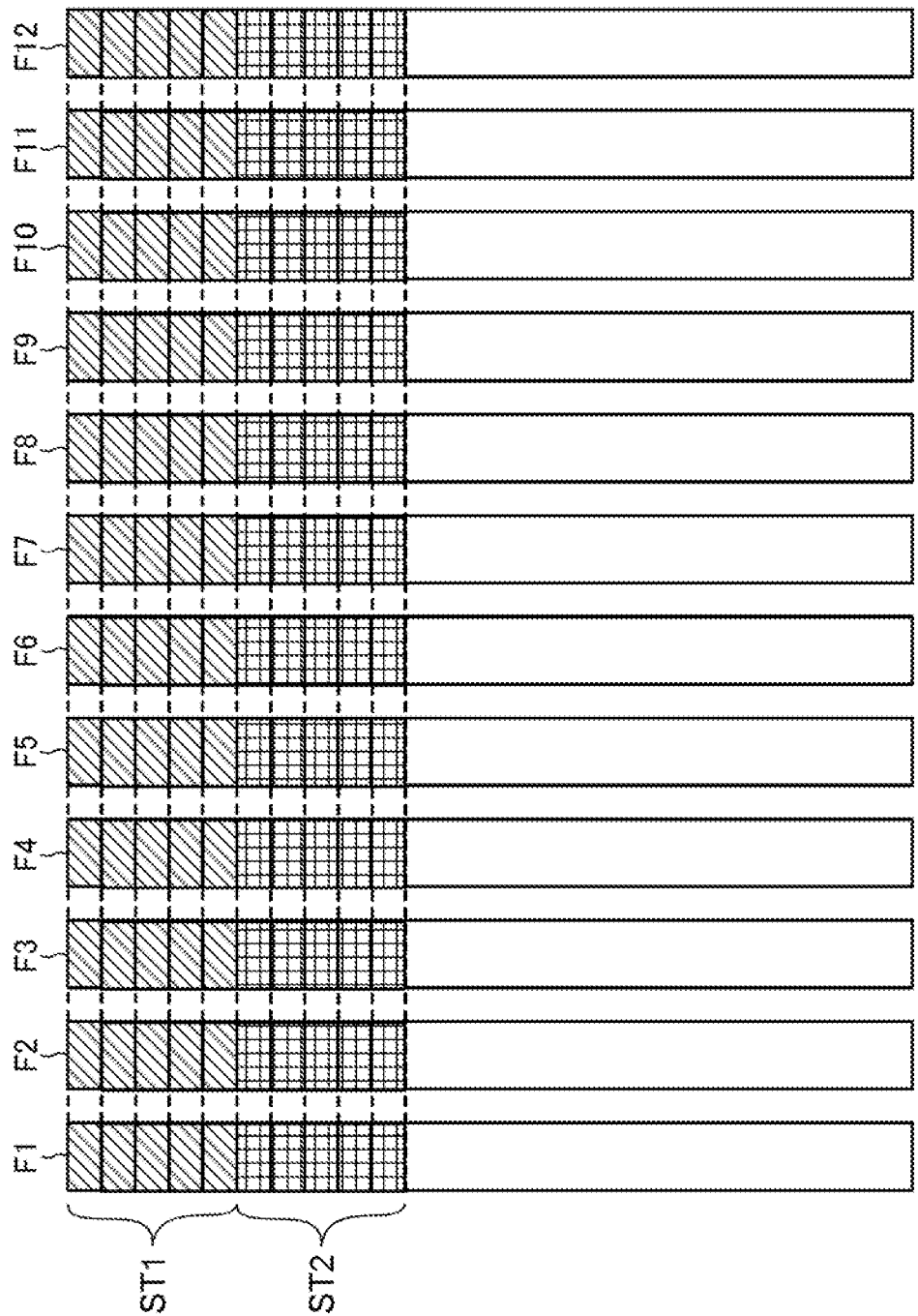

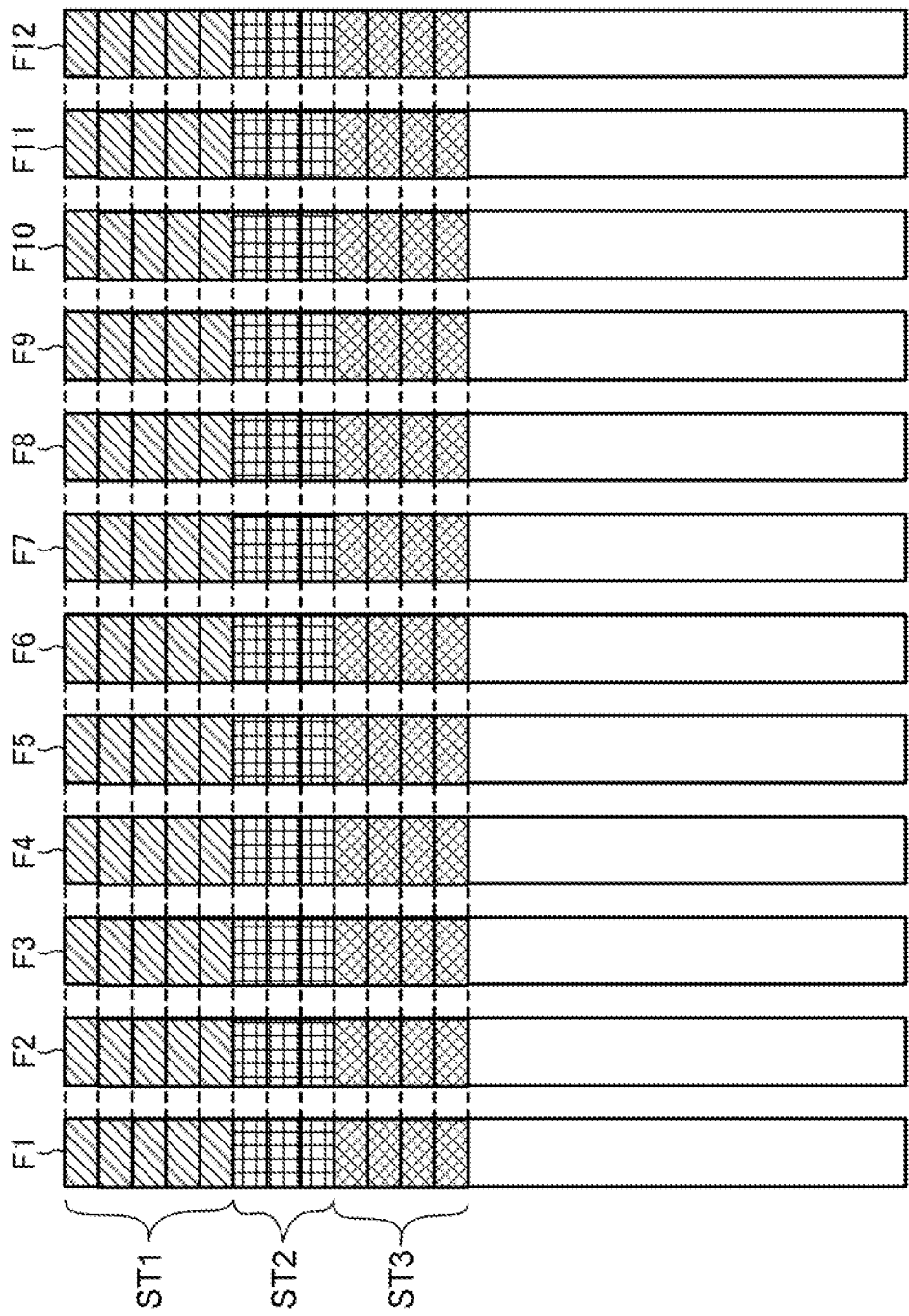

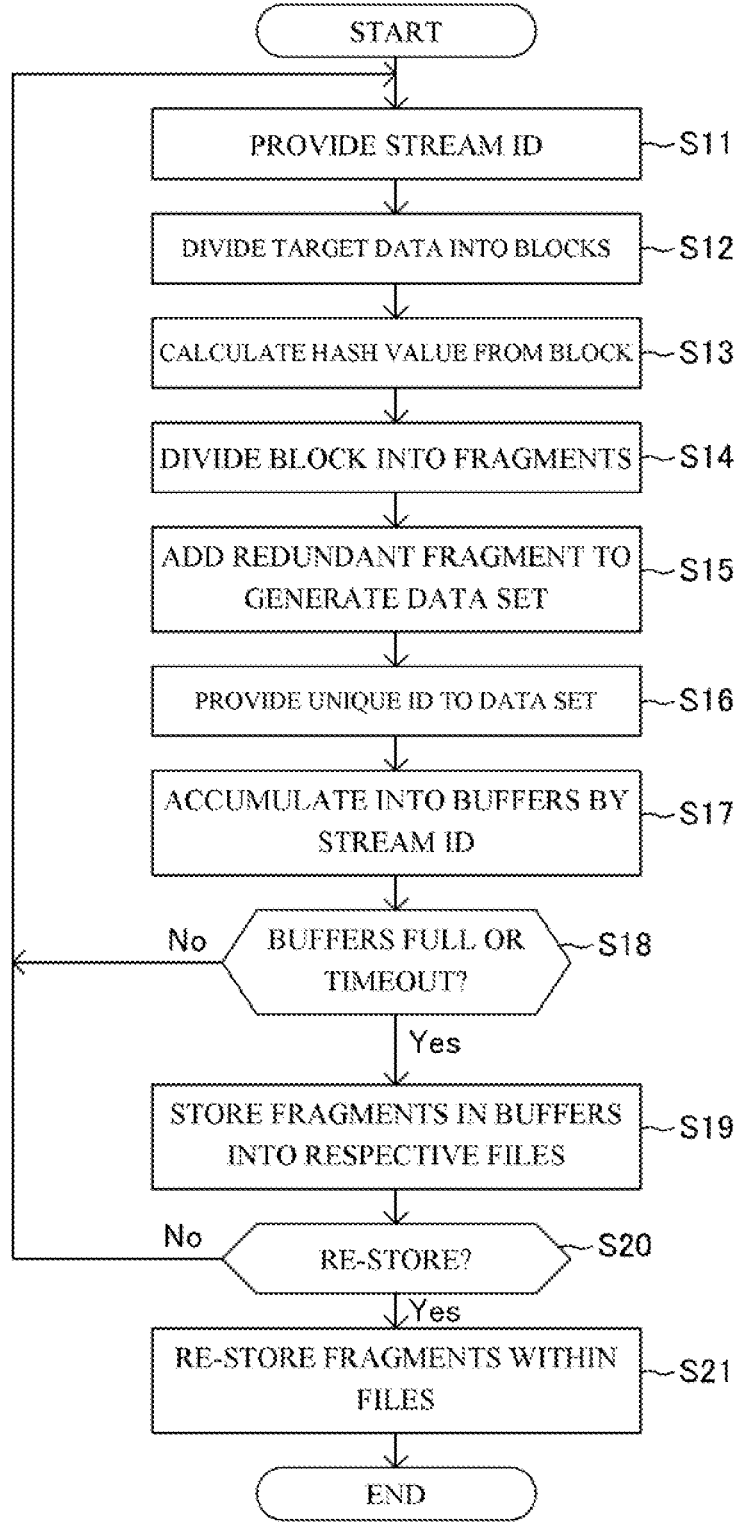

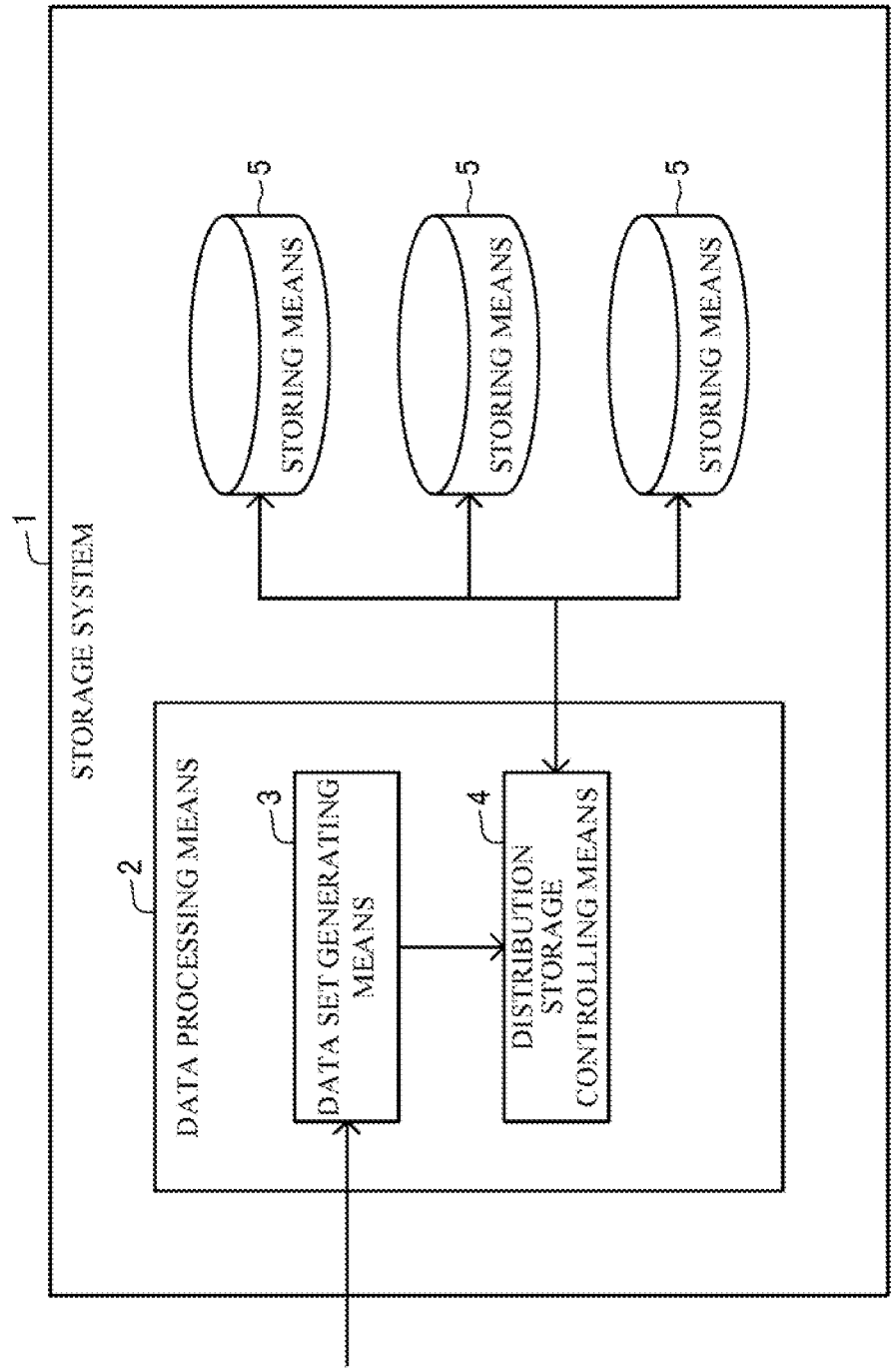

STORAGE SYSTEM

The present application is the National Phase of PCT/JP2009/003962, filed Aug. 20, 2009, which is based upon and claims the benefit of priority from Japanese patent application No. 2009-015261, filed on Jan. 27, 2009, the disclosure of which is incorporated herein in its entirety by reference.

TECHNICAL FIELD

The present invention relates to a storage system, and specifically, relates to a storage system that distributes and stores data into a plurality of storage devices.

BACKGROUND ART

In recent years, as computers have developed and become popular, various kinds of information are put into digital data. As a device for storing such digital data, there is a storage device such as a magnetic tape and a magnetic disk. Because data to be stored has increased day by day and the amount thereof has become huge, a high-capacity storage system is required. Moreover, it is required to keep reliability while reducing the cost for storage devices. In addition, it is required that data can be easily retrieved later. As a result, such a storage system is desired that is capable of automatically increasing the storage capacity and performance thereof, that eliminates a duplicate of storage to reduce the cost for storage, and that has high redundancy.

Under such a circumstance, in recent years, a content address storage system has been developed as shown in Patent Document 1. This content address storage system distributes data and stores into a plurality of storage devices, and specifies a storing position in which the data is stored based on a unique content address specified corresponding to the content of the data. To be specific, the content address storage system divides predetermined data into a plurality of fragments, adds a fragment as redundant data thereto, and stores these fragments into a plurality of storage devices, respectively.

Later, by designating a content address, it is possible to retrieve data, namely, a fragment stored in a storing position specified by the content address and restore predetermined data before divided from the plurality of fragments.

Further, the content address is generated so as to be unique corresponding to the content of data. Therefore, in the case of duplicated data, it is possible to acquire data of the same content with reference to data in the same storing position. Thus, it is not necessary to separately store duplicated data, and it is possible to eliminate duplicated recording and reduce the data capacity.

[Patent Document 1] Japanese Unexamined Patent Application Publication No. JP-A 2005-235171

However, as described above, a content address storage system divides predetermined data into a plurality of fragments and stores into a plurality of storage devices, respectively. Therefore, when retrieving predetermined data, it is necessary to access by specifying the storing positions of the respective fragments obtained by dividing the data. This causes a problem that it takes time to execute a process of specifying a storing position to access and the retrieval efficiency decreases.

SUMMARY

Accordingly, an object of the present invention is to provide a high-performance storage system that is capable of retrieving data at high speeds while maintaining redundancy, which is the aforementioned task.

In order to achieve the object, a storage system of an embodiment of the present invention is equipped with a plurality of storing means and a data processing means configured to store data into the plurality of storing means and retrieve the data stored in the storing means.

Further, the data processing means includes: a data set generating means configured to generate division data by dividing storage target data into a plurality of pieces and also generate redundant data for restoring the storage target data, thereby generating a data set composed of a plurality of fragment data that are the division data and the redundant data; and a distribution storage controlling means configured to distribute and store the fragment data into the respective storing means.

Furthermore, the distribution storage controlling means is configured to store the fragment data composing the data set in same positions within storage regions formed in the respective storing means, respectively.

Further, a computer program of another embodiment of the present invention is a computer program comprising instructions for causing an information processing device equipped with a plurality of storing means to realize a data processing means configured to store data into the plurality of storing means and retrieve the data stored in the storing means.

Further, the data processing means includes: a data set generating means configured to generate division data by dividing storage target data into a plurality of pieces and also generate redundant data for restoring the storage target data, thereby generating a data set composed of a plurality of fragment data that are the division data and the redundant data; and a distribution storage controlling means configured to distribute and store the fragment data into the respective storing means.

Furthermore, the distribution storage controlling means is configured to store the fragment data composing the data set in same positions within storage regions formed in the respective storing means, respectively.

Further, in a data processing method of another embodiment of the present invention, an information processing device equipped with a plurality of storing means stores data into the plurality of storing means and retrieves the data stored in the storing means.

Further, at the time of storing data into the plurality of storing means, the information processing device: generates division data by dividing storage target data into a plurality of pieces, and also generates redundant data for restoring the storage target data, thereby generating a data set composed of a plurality of fragment data that are the division data and the redundant data; distributes and stores the fragment data into the respective storing means; and Furthermore, at the time of storing the fragment data into the respective storing means, the information processing device stores the fragment data composing the data set in same positions within storage regions formed in the respective storing means, respectively.

With the configurations as described above, the present invention can realize a high-performance storage system that is capable of retrieving data at high speeds while maintaining redundancy.

BRIEF DESCRIPTION OF DRAWINGS

FIG. 13 is a view showing the aspect of storage of data into the storage devices in the storage system disclosed in FIG. 10;

FIG. 14 is a view showing the aspect of storage of data into the storage devices in the storage system disclosed in FIG. 10;

FIG. 15 is a view showing the aspect of storage of data into the storage devices in the storage system disclosed in FIG. 10;

FIG. 16 is a view showing the aspect of storage of data into the storage devices in the storage system disclosed in FIG. 10;

FIG. 17 is a flowchart showing an operation of the storage system disclosed in FIG. 10; and FIG. 18 is a function block diagram showing a configuration of a storage system in a third exemplary embodiment of the present invention.

EXEMPLARY EMBODIMENTS

First Exemplary Embodiment

Figure 1:
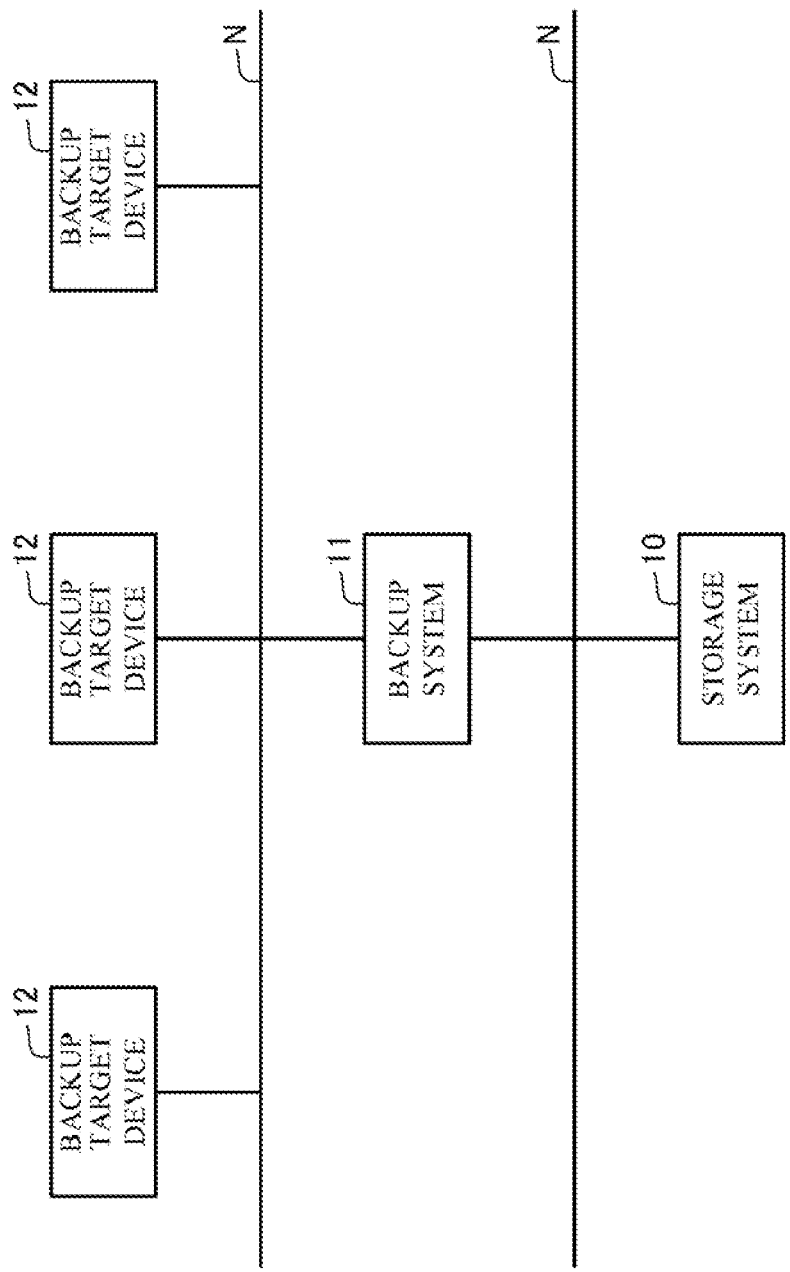
FIG. 1 is a block diagram showing a configuration of a whole system including a storage system of a first, exemplary embodiment of the present invention.
Figure 2:
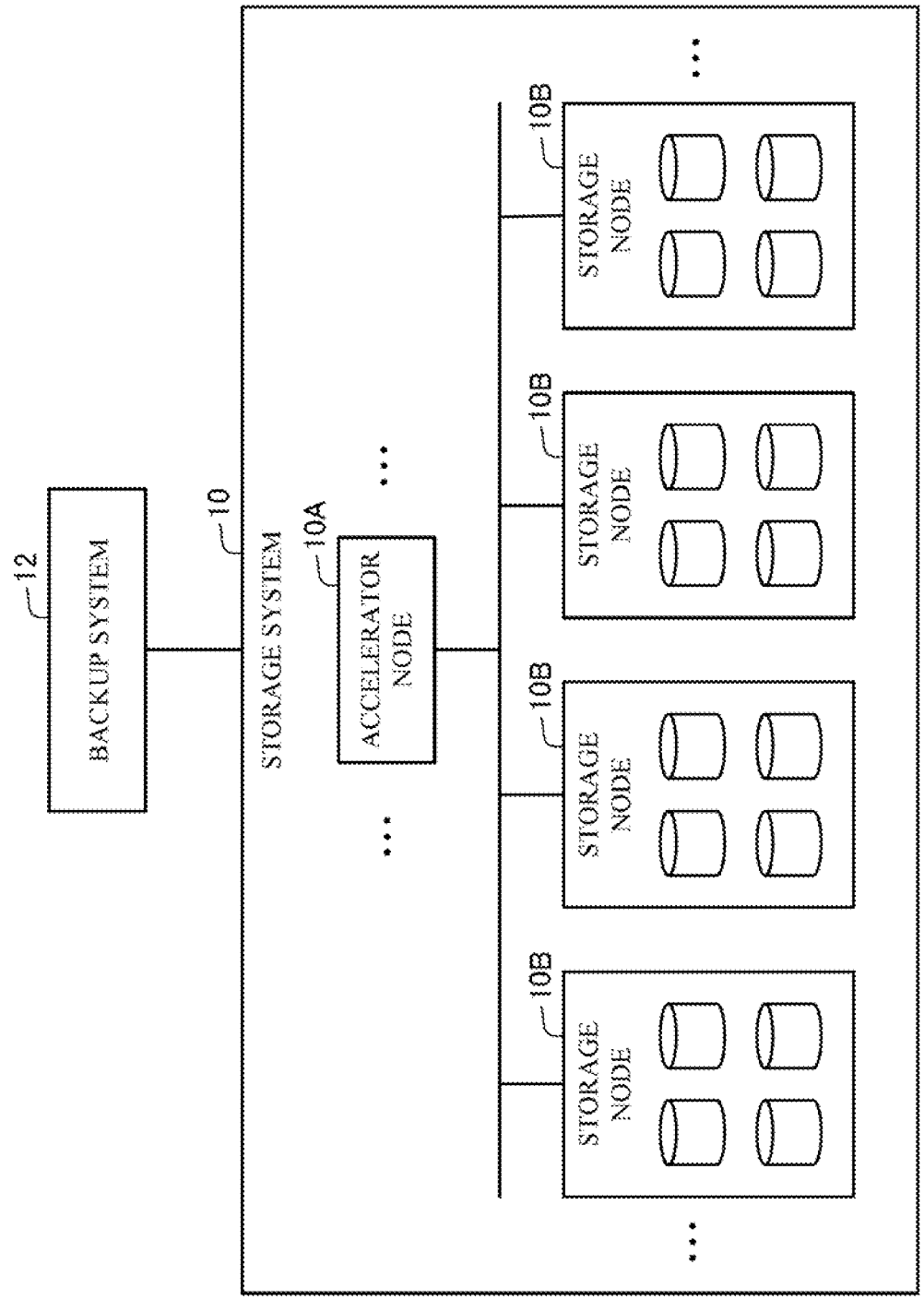
FIG. 2 is a block diagram schematically showing a configuration of the storage system of the first exemplary embodiment of the present invention.
Figure 3:
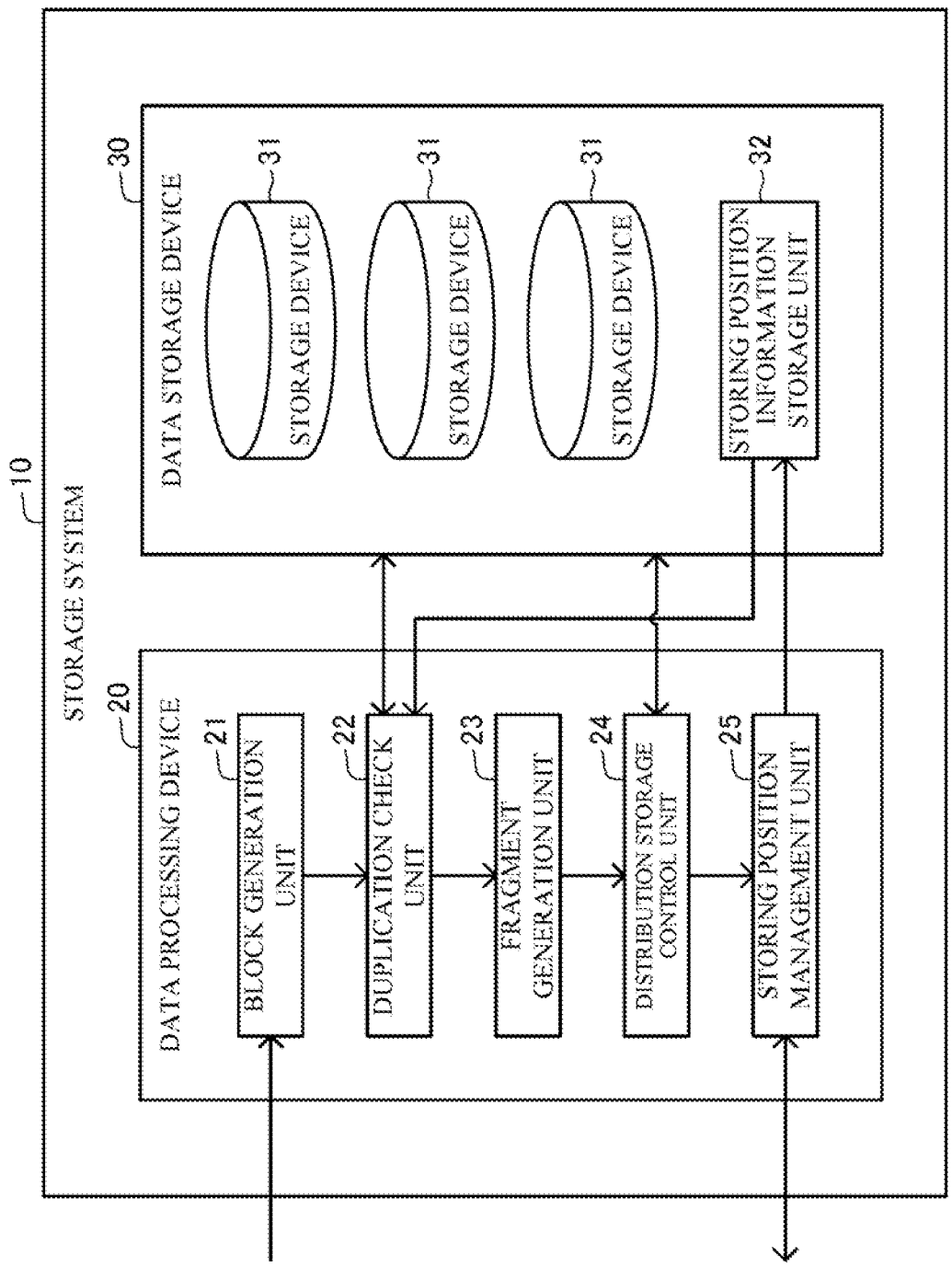
FIG. 3 is a function block diagram showing the configuration of the storage system of the first exemplary embodiment of the present invention.
Figure 4:
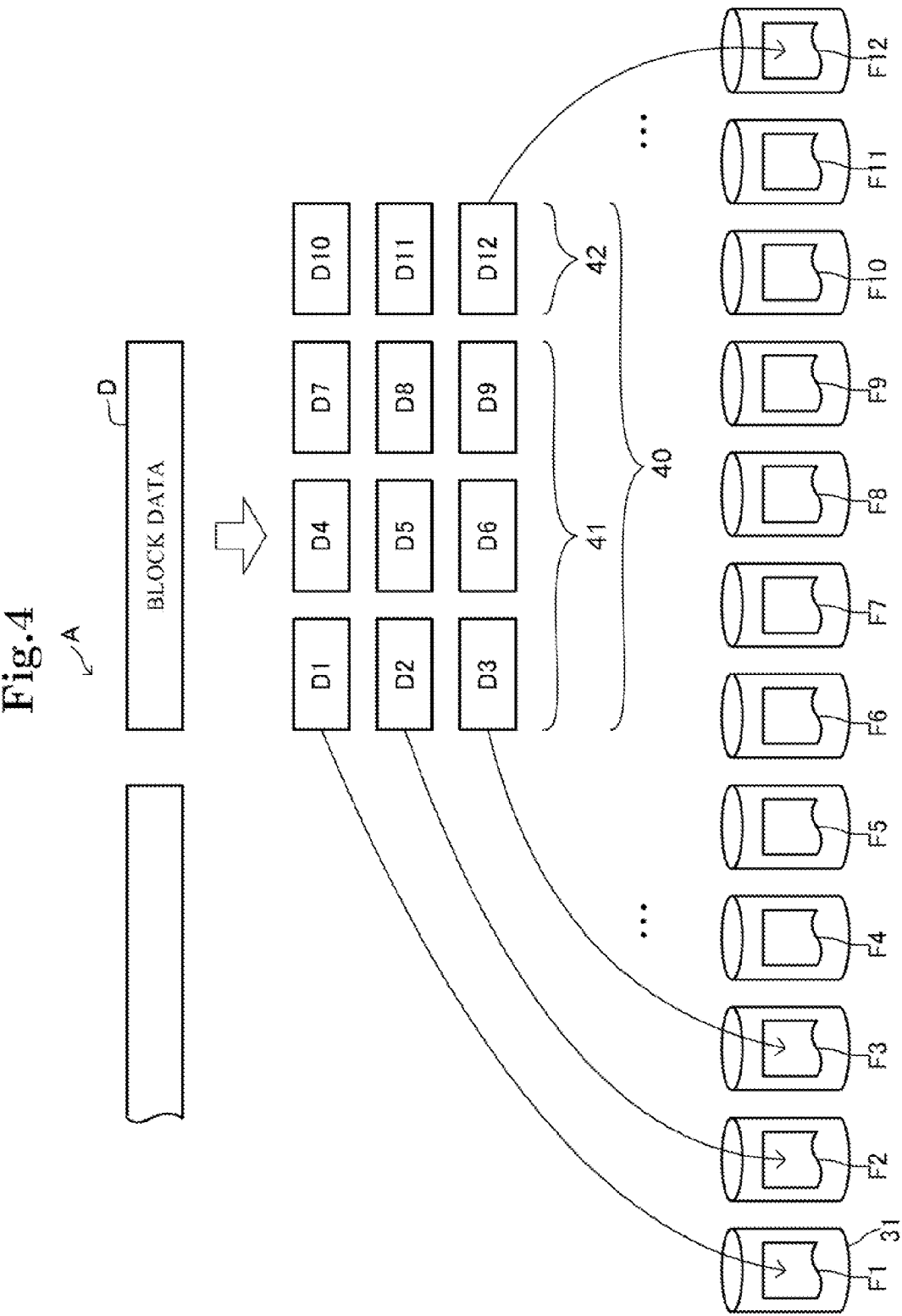
FIG. 4 is an explanation view for explaining an aspect of a data storage process in the storage system disclosed in FIG. 3.
Figure 5:
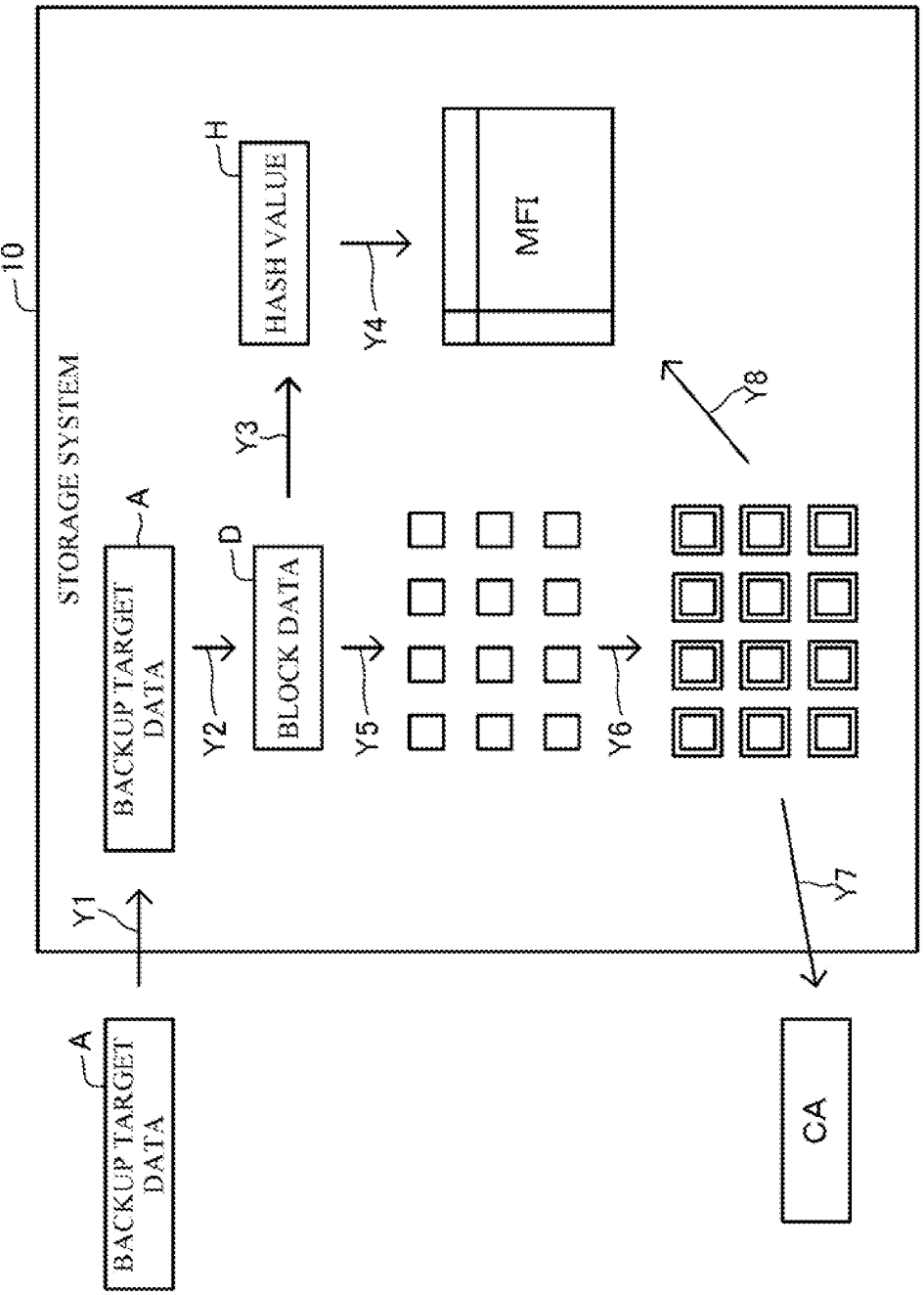
FIG. 5 is an explanation view for explaining the aspect of the data storage process in the storage system disclosed in FIG. 3.
Figure 6:
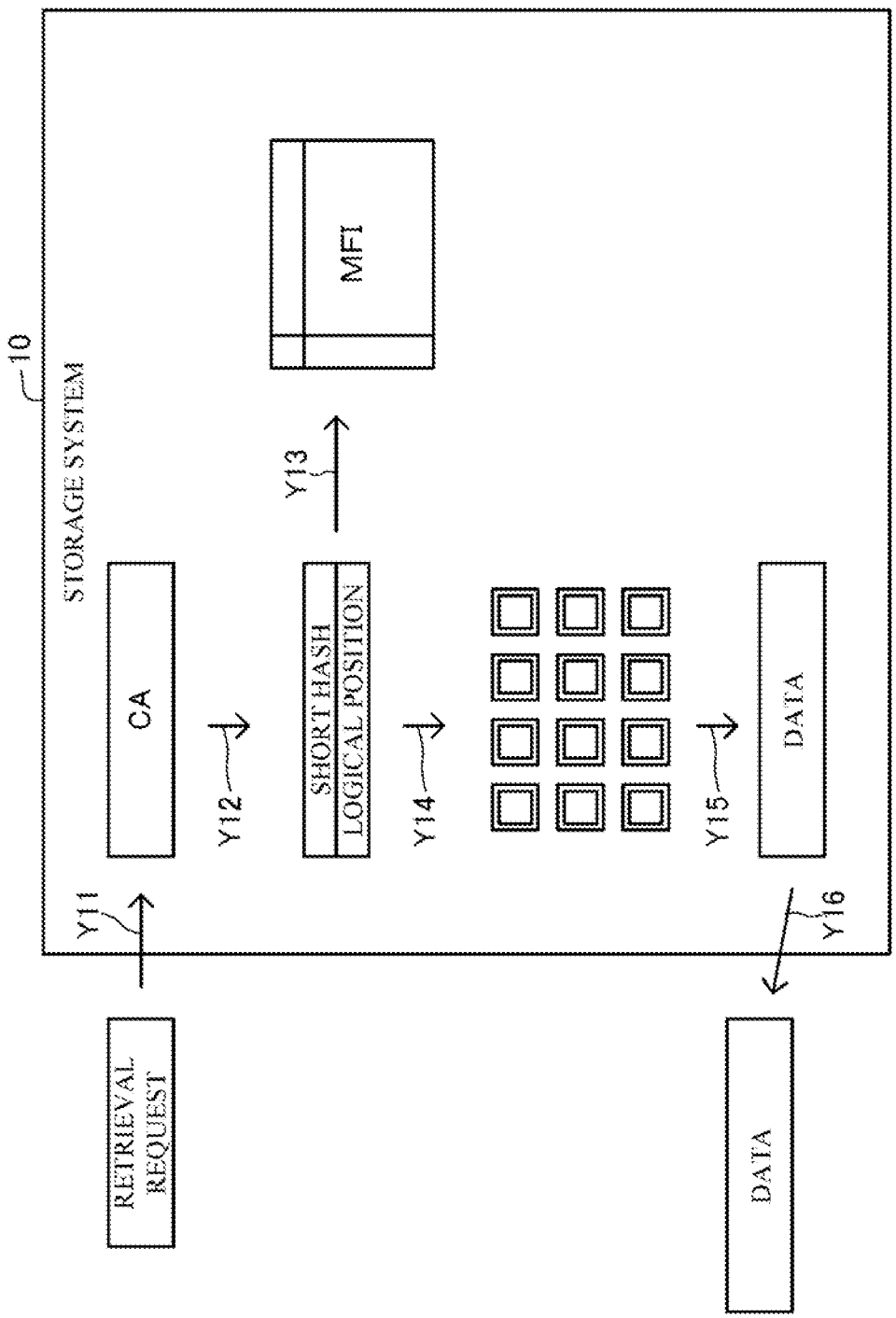
FIG. 6 is an explanation view for explaining an aspect of a data retrieval process in the storage system disclosed in FIG. 3.
Figure 7:
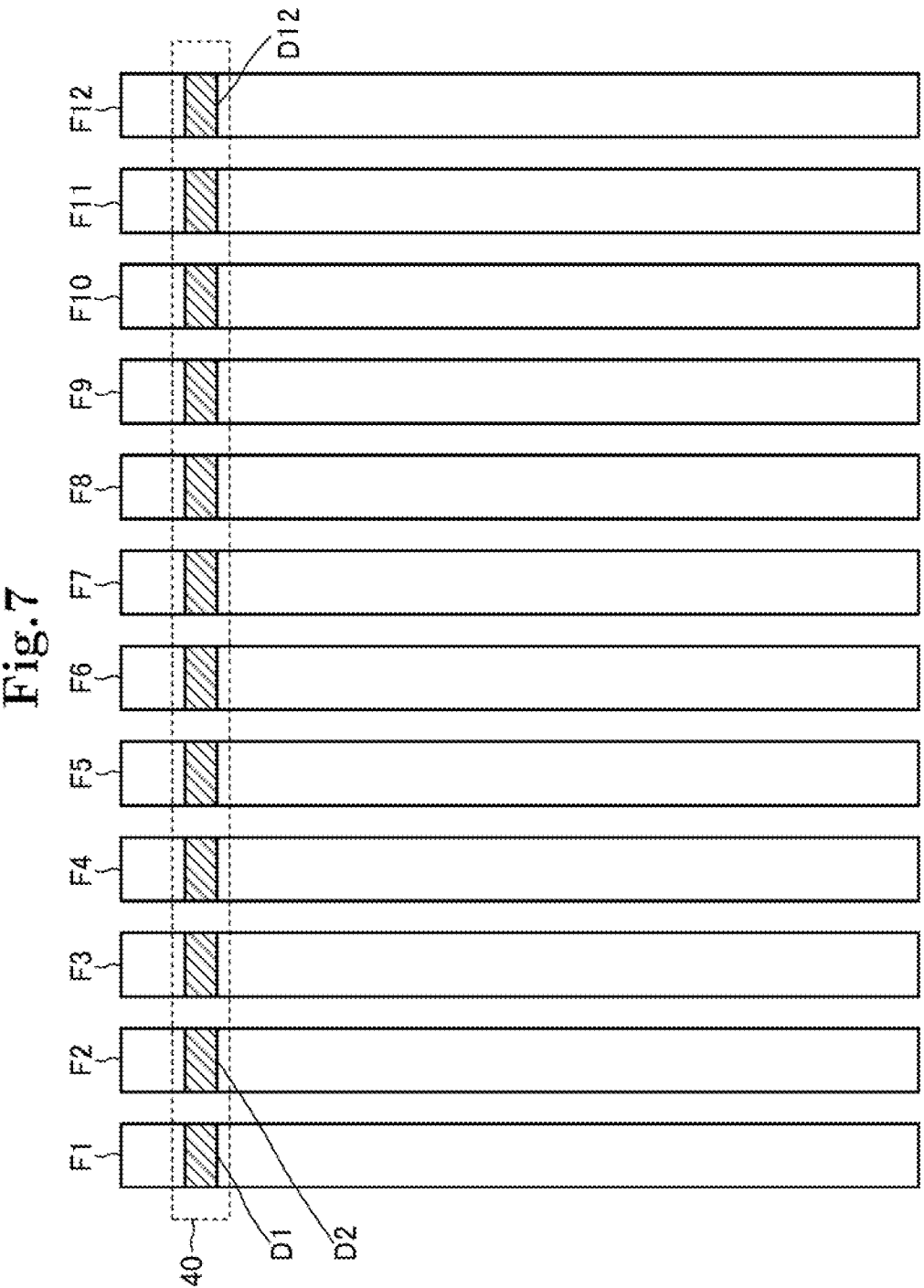
FIG. 7 is a view showing an aspect of storage of data into storage devices in the storage system disclosed in FIG. 4.
Figure 8:
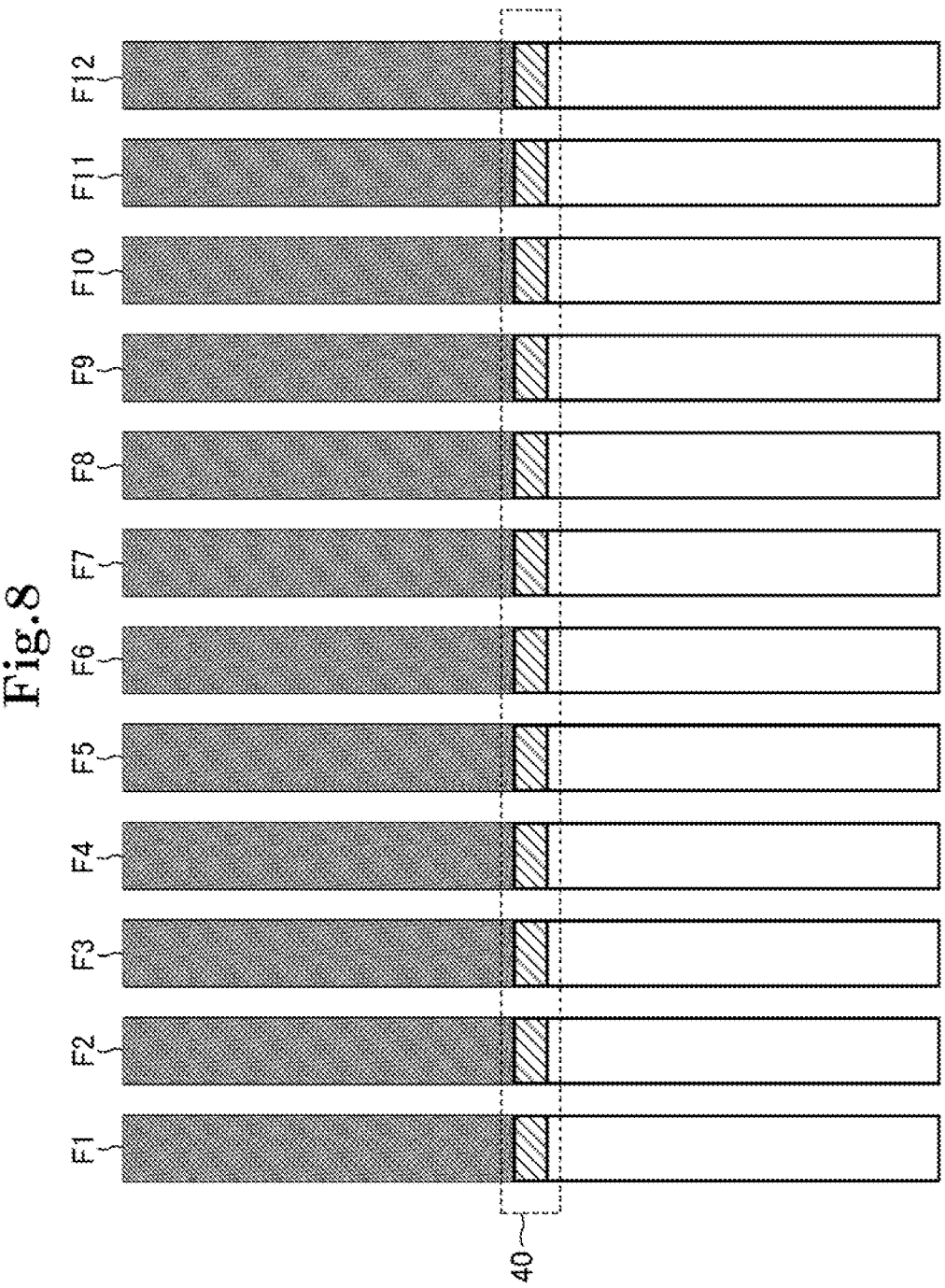
FIG. 8 is a view showing the aspect of storage of data into the storage devices in the storage system disclosed in FIG. 4.
Figure 9:
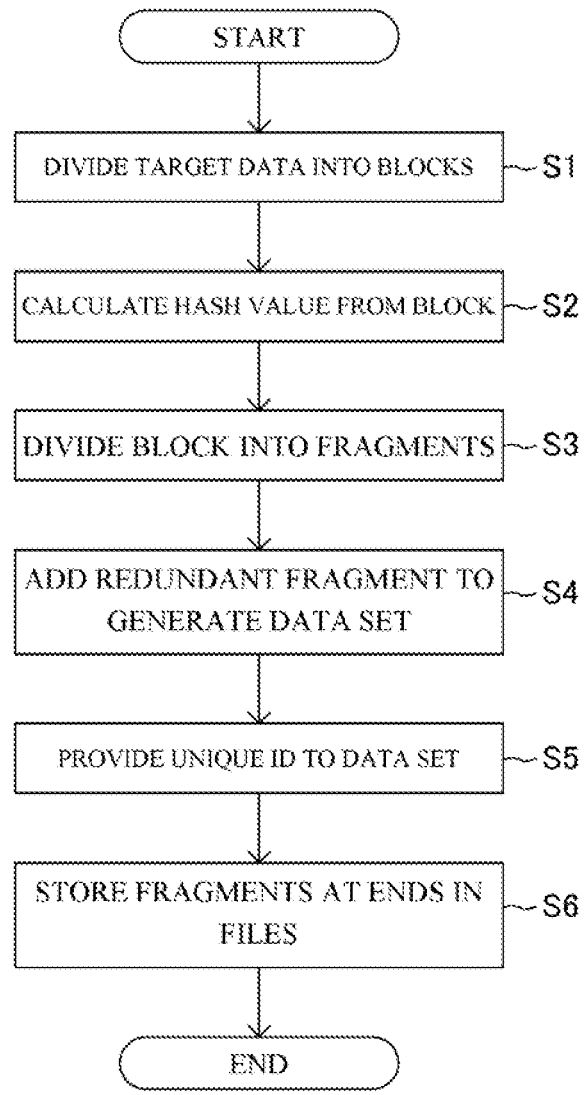
FIG. 9 is a flowchart showing an operation of the storage system disclosed in FIG. 3.

A first exemplary embodiment of the present invention will be described with reference to FIGS. 1 to 9. FIG. 1 is a block diagram showing a configuration of a whole system. FIG. 2 is a block diagram schematically showing a storage system, and FIG. 3 is a function block diagram showing the configuration. FIGS. 4 to 6 are explanation views for explaining an operation of a storage system. FIGS. 7 and 8 are views showing a data storage state in the storage system. FIG. 9 is a flowchart showing an operation of the storage system.

This exemplary embodiment herein shows a specific example of a storage system disclosed in a third exemplary embodiment described later. Below, a case that the storage system is configured by connecting a plurality of server computers will be described. However, the storage system of the present invention is not limited to the configuration with a plurality of computers, and may be configured by one computer.

[Configuration]

As shown in FIG. 1, a storage system 10 of the present invention is connected to a backup system 11 that controls a backup process via a network N. The backup system 11 acquires backup target data (storage target data) stored in a backup target device 12 connected via the network N, and requests the storage system 10 to store. Thus, the storage system 10 stores the backup target data requested to be stored as a backup.

As shown in FIG. 2, the storage system 10 of this exemplary embodiment employs a configuration in which a plurality of server computers are connected. To be specific, the storage system 10 is equipped with an accelerator node WA serving as a server computer that controls the storing/reproducing operation of the storage system 10, and a storage node 10B serving as a server computer equipped with a storage device that stores data. The number of the accelerator node 10A and the number of the storage node 10B are not limited to those shown in FIG. 2, and a configuration that more nodes 10A and more nodes 10B are connected may be employed.

Further, the storage system 10 of this exemplary embodiment is a content address storage system that divides data and makes the data redundant, distributes the data and stores into a plurality of storage devices, and specifies a storing position in which the data is stored by a unique content address specified in accordance with the content of this data. The specific configuration will be described in detail.

Further, assuming the storage system 10 is one system, a configuration and function of the storage system 10 will be described below. In other words, the configuration and function of the storage system 10 described below may be included in either the accelerator node 10A or the storage node 10B. The storage system 10 is not limited to the configuration including the accelerator node 10A and the storage node 10B. The storage system 10 may have any configuration. Moreover, the storage system 10 is not limited to a content address storage system.

FIG. 3 shows a configuration of the storage system 10. As shown in this drawing, the storage system 10 is equipped with a data storage device 30 that stores data, and a data processing device 20 that controls the operation of storing and retrieving data into and from the data storage device 30. Actually, the data processing device 20 is configured by a plurality of arithmetic devices such as a CPU (Central Processing Unit) of the accelerator node 10A and a CPU of the storage node 10B shown in FIG. 2. Moreover, the storage device 30 is configured by a hard disk of the accelerator node 10A and a hard disk of the storage node 10B shown in FIG. 2.

Then, as shown in FIG. 3, the data processing device 20 is equipped with a block generation unit 21, a duplication check unit 22, a fragment generation unit 23, a distribution storage control unit 24 and a storing position management unit 25, which are configured by building in a program. Moreover, the data storage device 30 is equipped with a plurality of storage devices 31 each storing backup target data and a storing position information storage unit 32 that stores the position of stored data. Below, the respective configurations will be described in detail. At the same time, an aspect of data processing by the respective configurations will be described with reference to FIGS. 4 to 8. The abovementioned program is provided to the storage system 10, for example, in a state stored in a storing medium such as a CD-ROM. Alternatively, the program may be stored in a storage device of another server computer on the network and provided from the other server computer to the storage system 10 via the network.

First, upon acceptance of an input of backup target data A as shown by arrow Y1 in FIG. 5, the block generation unit 21 divides the backup target data A into predetermined capacities (e.g., 64 KB) of block data D, as shown in FIG. 4 and by arrow Y2 in FIG. 5. Then, based on the data content of this block data D, the block generation unit 21 calculates a unique hash value H (content identification information) representing the data content (arrow Y3). For example, a hash value H is calculated based on the data content of the block data D by using a preset hash function. The process by the block generation unit 21 is executed in the accelerator node 10A.

Further, the duplication check unit 22 (a duplication checking means), by using the hash value H of the block data D of the backup target data A, checks whether or not the block data D has already been stored in the storage devices 31. To be specific, the hash value H and content address CA that represents the storing position of the block data D having already been stored are related and registered in an MFI (Main Fragment Index) file. Therefore, in a case that the hash value H of the block data D calculated before storage exists in the MFI file, the duplication check unit 22 can determine that the block data D having the same content has already been stored (arrow Y4 in FIG. 5). In this case, the duplication check unit 22 acquires a content address CA related to a hash value H within the MFI that coincides with the hash value H of the block data D before storage, from the MFI file. Then, the duplication check unit 22 returns this content address CA as the content address CA of the block data D required to be stored. Consequently, the already stored data referred to by using this content address CA is used as the block data D required to be stored, and it becomes unnecessary to store the block data D required to be stored.

In a case that a plurality of storage nodes 10B exist, based on a hash value H calculated from block data D as described above, one storage node called Write Initiator (WI) that handles an initial process at the time of data storage (a compression process and a fragmentation process, which will be described later) is determined.

Further, the fragment generation unit 23 (a data set generating means) compresses block data D determined by the duplication check unit 22 that it has not been stored yet as described above, and divides the data into a plurality of fragment data having predetermined capacities as shown by arrow Y5 in FIG. 5. For example, as shown by reference numerals D1 to D9 in FIG. 4, the fragment generation unit 23 divides the data into nine fragment data (division data 41). Moreover, the fragment generation unit 23 generates redundant data so that the original block data can be restored even if some of the fragment data obtained by division are lost, and adds the redundant data to the fragment data 41 obtained by division. For example, as shown by reference numerals D10 to D12 in FIG. 4, the fragment generation unit 23 adds three fragment data (redundant data 42). Thus, the fragment generation unit 23 generates a data set 40 including twelve fragment data composed of the nine division data 41 and the three redundant data. The process by the fragment generation unit 23 is executed by one storage node called WI mentioned above.

Further, the distribution storage control unit 24 (a distribution storage controlling means) distributes and stores, one by one, the fragment data composing the data set generated by the fragment generation unit 23 into storage regions formed in the storage devices 31. For example, as shown in FIG. 4, in a case that the twelve fragment data D1 to D12 are generated, the distribution storage control unit 24 stores one of the fragment data D1 to D12 into one of data storage files F1 to F12 (data storage regions) formed in the twelve storage devices 31 (refer to arrow Y6 in FIG. 6).

At this moment, the distribution storage control unit 24 stores the respective fragment data D1 to D12 composing the one data set 40 in the same positions within the respective data storage files F1 to F12. For example, as shown in FIG. 7, the distribution storage control unit 24 stores all of the fragment data D1 to D12 in the same positions with respect to the beginning positions of the respective data storage files F1 to F12. In the example of FIG. 7, the upper end in the drawing is the beginning of the file.

To be specific, without previously setting storing positions in the respective data storage files F1 to F12, the distribution storage control unit 24 stores the fragment data D1 to D12, respectively, in vacant storing positions next to data having been stored in the respective storage files F1 to F12. For example, in FIG. 8, data have already been stored up to meshed portions in the respective data storage files F1 to F12, and the distribution storage control unit 24 stores the respective fragment data D1 to D12 into regions next thereto, so that the storing positions of the one data set 40 coincide. Moreover, specifically, the distribution storage control unit 24 stores the respective fragment data D1 to D12 composing the one data set 40 into the respective data storage files F1 to F12 at the same time.

Further, the distribution storage control unit 24 provides the same identification information (Write Record Seq Num) to the respective fragment data D1 to D12 composing the data set 40 so as to identify that the fragment data compose the same data set 40, and stores into the data storage files F1 to F12. Then, the distribution storage control unit 24 checks the identification information at any timing such that the resource of the storage system 10 is available, thereby being capable of checking whether the respective fragment data composing the same data set 40 are stored in the same storing positions within the respective data storage files F1 to F12. Therefore, if the respective fragment data stored in the same storing positions within the respective data storage files F1 to F12 do not all include the same identification information (Write Record Seq Num), the distribution storage control unit 24 corrects the storing position so that the respective fragment data are stored in the same storing positions, and re-stores the data.

In the above description, the distribution storage control unit 24 stores the respective fragment data D1 to D12 composing the data set 40 in the same positions within the respective logical storage regions like the data storage files, but may store in the physically same positions within the respective storage devices 31.

Further, the storing position management unit 25 (a storing position information managing means) generates and manages a content address CA, which represents the storing positions of the fragment data D1 to D12 stored in the storage devices 31 as described above, that is, the storing position of the block data D to be restored by the fragment data D1 to D12. To be specific, the storing position management unit 25 generates a content address CA by combining part (short hash) of a hash value H calculated based on the content of the stored block data D with information representing a logical storing position. Then, the storing position management unit 25 returns this content address CA to a file system within the storage system 10, namely, to the accelerator node 10A (arrow Y7 in FIG. 5). The accelerator node 10A then relates identification information such as the file name of the backup target data with the content address CA and manages in the file system.

Further, the storing position management unit 25 relates the content address CA of the block data D with the hash value H of the block data D, and the respective storage nodes 10B manage in the MFI file. Thus, the content address CA is related with the information specifying the file, the hash value H and so on, and stored into the storage devices 30 of the accelerator node 10A and the storage nodes 10B (a storing position information storage unit 32).

Furthermore, the storing position management unit 25 executes a control of retrieving backup target data stored as described above. For example, when the storage system 10 accepts a retrieval request with a specific file designated (refer to arrow Y11 in FIG. 6), based on the file system, the storing position management unit 25 firstly designates a content address CA, which is composed of short hash as part of a hash value corresponding to the file relating to the retrieval request and information of a logical position (refer to arrow Y12 in FIG. 6). Then, the storing position management unit 25 checks whether or not the content address CA is registered in the MFI file (refer to arrow 13 in FIG. 6). In a case that the content address CA is not registered, the requested data is not stored, so that the storing position management unit 25 returns an error response.

On the other hand, in a case that the content address CA relating to the retrieval request is registered, the storing position management unit 25 specifies a storing position designated by the content address CA, and retrieves each fragment data stored in the specified storing position as data requested to be retrieved (refer to arrow Y14 in FIG. 6). At this moment, if knowing the data storage files F1 to F12 storing the respective fragments and the storing position of one of the fragment data in the data storage files, the storing position management unit 25 can specify the storing positions of the other fragment data because the storing positions are the same.

Then, the storing position management unit 25 restores the block data D from the respective fragment data retrieved in response to the retrieval request (refer to arrow Y15 in FIG. 6). Moreover, the storing position management unit 25 connects a plurality of restored block data D to restore into a group of data like the file A, and returns to the accelerator node 10A that is controlling the retrieval (refer to arrow Y16 in FIG. 6).

[Operation]

Next, an operation of the abovementioned storage system will be described with reference to a flowchart of FIG. 9.

At first, an operation by the storage system 10 of accepting backup target data from a predetermined backup target device 12 via the backup system 11 and storing the backup target data into the storage devices 31 will be described (a data storage process).

Firstly, the storage system 10, namely, the accelerator node 10A divides the backup target data A into predetermined capacities (e.g., 64 KB) of block data D (step S1). Based on the data content of this block data D, the accelerator node 10A calculates a unique hash value H (content identification information) representing the data content (step S2). Then, it is checked whether or not this hash value H is registered in the MFI file.

Here, in a case that the hash value H is registered, a content address CA related with the hash value H of the block data D within the MFI file is returned to the file system as the storing position of this block data D. In other words, because the same data as the backup target data is stored, it is considered that the backup target data is stored, by using the same data having already been stored. Therefore, at the time of retrieval of this backup target data later, the file system retrieves the data of the storing position represented by the content address CA, and the same data can be thereby retrieved.

On the other hand, in a case that the hash value of the block data D is not registered in the MFI file, that is, in a case that the same data as the block data D is not stored in the storing devices 31, a process of storing the block data D is then executed. At this moment, firstly, storage nodes 10B that actually store the data based on part of the hash value calculated as described above, and one of the storage nodes 10B is determined as Write Initiator (WI) that executes a pre-storing process on the block data D as described below.

Subsequently, the storage node 10B determined as WI as described above compresses the block data D and thereafter divided into, for example, nine fragment data (step S3). Moreover, the storage node 10B determined as WI adds, for example, three redundant data to the fragment data so that the block data D can be restored even if some of the division data are lost. Then, the storage node 10B determined as WI generates a data set including twelve fragment data composed of the nine division data and the three redundant data (step S4, a data set generating step).

Subsequently, the storage node 10B determined as WI provides ID for identifying the data set to the respective fragments (step S5). In other words, the storage node 10B determined as WI provides the same ID to all of the fragment data that are generated by dividing the one block data D and that compose the data set. Then, the storage node 10B checks whether or not a plurality of data storage files F1 to F12 to become the destinations of storage of the data exist within the storing device 31 of the storage node 10B and the storage devices 31 of the other storage nodes 10B, and stores the fragment data D1 to D12 into the respective data storage files F1 to F12 (step S6, a distribution storage controlling step). At this moment, the storage node 10B stores the fragment data into the data storage files one by one.

Then, at the time of distribution and storage described above, the storage node 10B stores the fragment data D1 to D12 composing the one data set 40 in the same positions within the respective data storage files F1 to F12. For example, as shown in FIG. 7, the storage node 10B stores all of the fragment data D1 to D12 in the same positions with respect to the beginnings of the respective data storage files F1 to F12.

As a specific process, the storage node 10B stores the fragment data D1 to D12 composing the one data set 40 into the respective data storage files F1 to F12 at the same time. At this moment, the storage node 10B stores the fragment data D1 to D12 in vacant storing positions next to data having been stored in the respective data storage files F1 to F12, without previously setting storing positions in the respective data storage files F1 to F12 (step S6). For example, in FIG. 8, data are already stored in meshed portions of the respective data storage files F1 to F12, and the storage node 10B stores the respective fragment data D1 to D12 in the next regions so that the positions of the data set 40 coincide.

Then, the storage node 10B combines part (a beginning 8B) of the hash value H calculated based on the content of the stored block data D with information representing a logical storing position, thereby generating a content address CA that represents the storing positions of the fragment data D1 to D12 stored in the storage devices 31. Then, the storage node 10B returns this content address CA to the accelerator node 10A. Then, the accelerator node 10A relates the returned content address CA with the file name of the actually stored backup target data, and so on, and manages in the file system.

Further, the storage node 10B relates the generated content address CA of the block data D with the hash value H of the block data D, and the respective storage nodes 10B manage in the MFI file. As mentioned above, the MFI file that manages the hash value H and the content address CA is used for checking whether or not data of the same content has already been stored, when newly storing backup target data.

Here, at the time of storage of the respective fragment data D1 to D12 into the respective data storage files F1 to F12, that is, at the time of storage of the fragment data from the storage node 10B determined as WI into the other storage nodes 10B, communication between the storage nodes 10B may go down, or a communication delay may arise. In these cases, there is a possibility that all of the fragment data D1 to D12 composing the one data set 40 are not stored in the same positions within the respective data storage files F1 to F12. Assuming such cases, at any time, for example, when the resource is available, the storage system 10 executes a re-storing process with reference to identification information (Write Record Seq Num) of each data set included in the respective fragment data D1 to D12 having already been stored so that all of the fragment data D1 to D12 composing the one data set 40 are stored in the same positions within the respective data storage files F1 to F12.

Next, an operation by the storage system 10 of accepting a request for retrieval of data via the backup system 11 and retrieving the data from the storage devices 31 (a data retrieving step) will be described.

When the storage system 10 accepts a retrieval request, the accelerator node 10A first designates a content address CA composed of short hash and logical position information corresponding to a file relating to the retrieval request. The storage node 10B having accepted the content address CA then checks whether or not the content address CA is registered in the MFI file. In a case that the content address CA is not registered, the requested data is not stored, so that the storage node 10B returns an error response.

On the other hand, in a case that the content address CA is registered, based on the content address CA, the storage node 10B specifies the storing positions of the respective fragment data composing the data relating to the retrieval request. At this moment, if knowing the data storage files F1 to F12 storing the respective fragments and the storing position of one of the fragment data of the data storage files, the storage node 10B can specify the storing positions of the other fragment data because the storing positions are the same.

Then, the storage node 10B restores block data D from the respective fragment data retrieved in response to the retrieval request. Moreover, the storage node 10B connects a plurality of restored block data D to restore into a group of data like the file A, and returns to the accelerator node 10A controlling the retrieval.

Even if the storage node 10B cannot retrieve three fragment data of the twelve fragment data composing one data set due to trouble of the storage devices 31, the storage node 10B can restore original block data if the abovementioned three redundant data have been added. To be specific, when the twelve fragment data are stored in the separate storage devices 31 (disks), it is possible to simultaneously deal with trouble of three storage devices 31 at the maximum.

Thus, according to the storage system 10 of this exemplary embodiment, at the time of retrieval of stored data, by specifying the storing position of one fragment data of a data set composing the data, it is possible to easily specify the storing positions of the other fragment data. Therefore, at the time of data retrieval, it is not necessary to specify the positions of all fragments composing a data set, and it is possible to retrieve the data at high speeds. As a result, it is possible to realize a high-performance storage system that is capable of retrieving data at high speeds while maintaining redundancy.

Second Exemplary Embodiment

Figure 10:
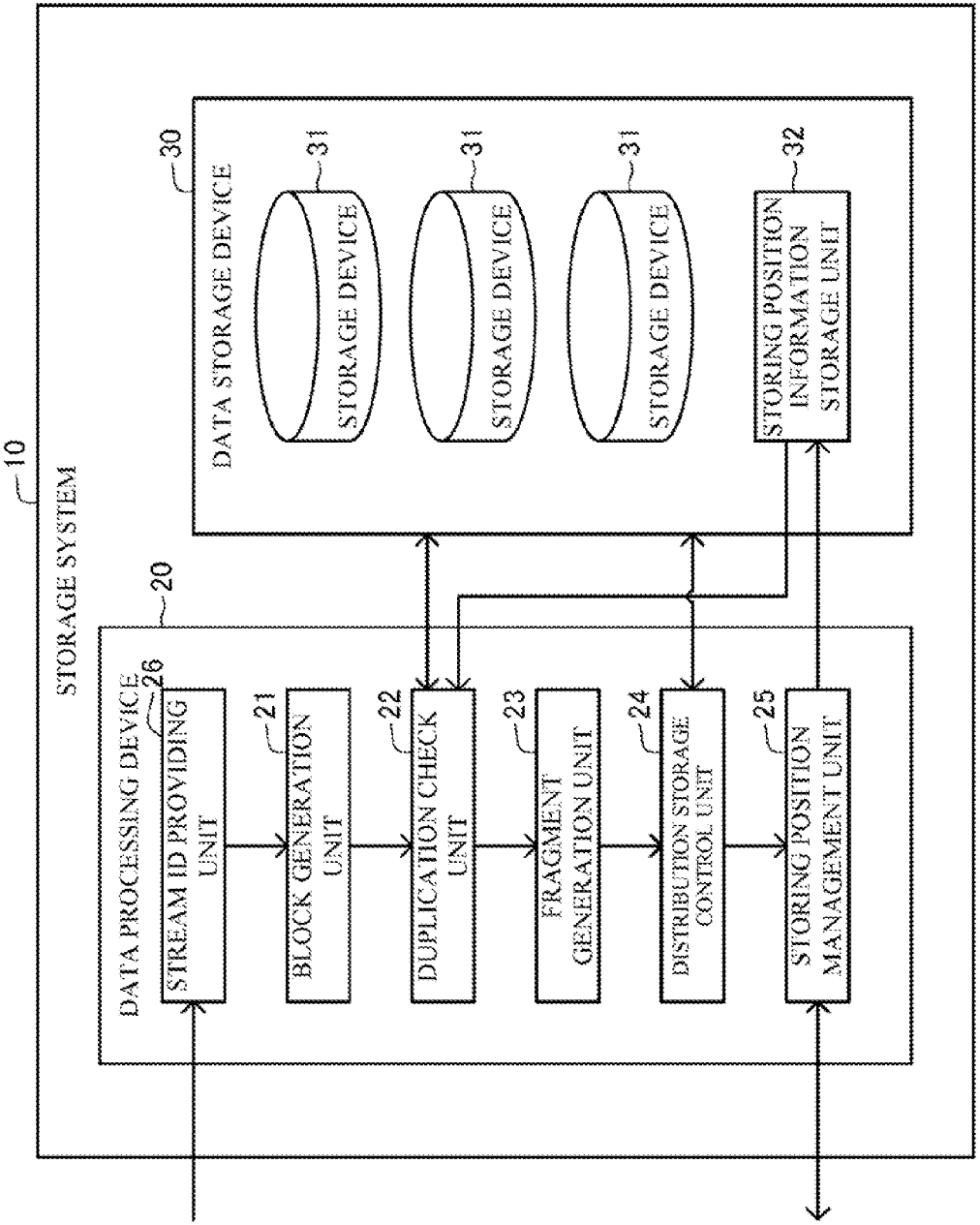
FIG. 10 is a function block diagram showing a configuration of a storage system in a second exemplary embodiment of the present invention.

Next, a second exemplary embodiment of the present invention will be described with reference to FIGS. 10 to 17. FIG. 10 is a function block diagram showing a configuration of a storage system. FIGS. 11 to 16 are explanation views for explaining an operation of the storage system. FIG. 17 is a flowchart showing an operation of the storage system.

[Configuration]

As shown in FIG. 10, a storage system 10 of this exemplary embodiment employs almost the same configuration as that of the first exemplary embodiment described above. In this exemplary embodiment, the storage system 10 is equipped with a stream ID provision unit 26 configured by installing a program into the data processing device 20. According to this, the distribution storage control unit 24, etc. have different configurations. Below, a different point from the first exemplary embodiment will be described mainly. The aforementioned program is provided to the storage system 10 by a storage medium such as a CD-ROM, or provided to the storage system 10 from another server computer via the network.

First, upon acceptance of an input of backup target data A, the stream ID provision unit 26 (an identification information providing means) provides stream ID that is identification information distinguishing the backup target data A that is a group of data. For example, the stream ID provision unit 26 provides stream ID=ST1 to the backup target data A, and provides stream ID=ST2 to backup target data B (not shown in the drawing).

Stream ID may be information that not only distinguishes backup target data but also distinguishes the backup target device 12 that is an output source of the backup target data A. In other words, the stream ID provision unit 26 provides different stream ID to each backup target data gathered by a predetermined rule.

Further, in a like manner as in the first exemplary embodiment described above, the block generation unit 21 divides the backup target data A into predetermined capacities (e.g., 64 KB) of block data D, and calculates a hash value H based on the data content of this block data D. Then, when dividing the backup target data A into block data D, the block generation unit 21 provides the stream ID provided to the backup target data A as described above, to the respective block data D as well. As mentioned above, the stream ID provision unit 26 is not limited by providing stream ID to backup target data A. For example, when the block generation unit 21 divides backup target data A into block data D, the stream ID provision unit 26 may provide the same stream ID distinguishing the backup target data A to each of the block data D.

Since the duplication check unit 22 has almost the same configuration as that of the first exemplary embodiment described above, a description thereof will be omitted. Moreover, the fragment generation unit 23 generates a data set 40 including twelve pieces of fragment data composed of division data obtained by dividing block data D and redundant data in a like manner as described above.

The fragment generation unit 23 then provides the stream ID having been provided to the block data D that is the original of the fragment data, namely, the block data D to be restored from the fragment data D1 to D12, to all of the generated fragment data D1 to D12.

Further, as in the exemplary embodiment 1 described above, basically, the distribution storage control unit 24 stores the fragment data D1 to D12 composing the one data set 40 in the same positions within the data storage files F1 to F12 formed within the storage devices 31, respectively.

Figure 11:
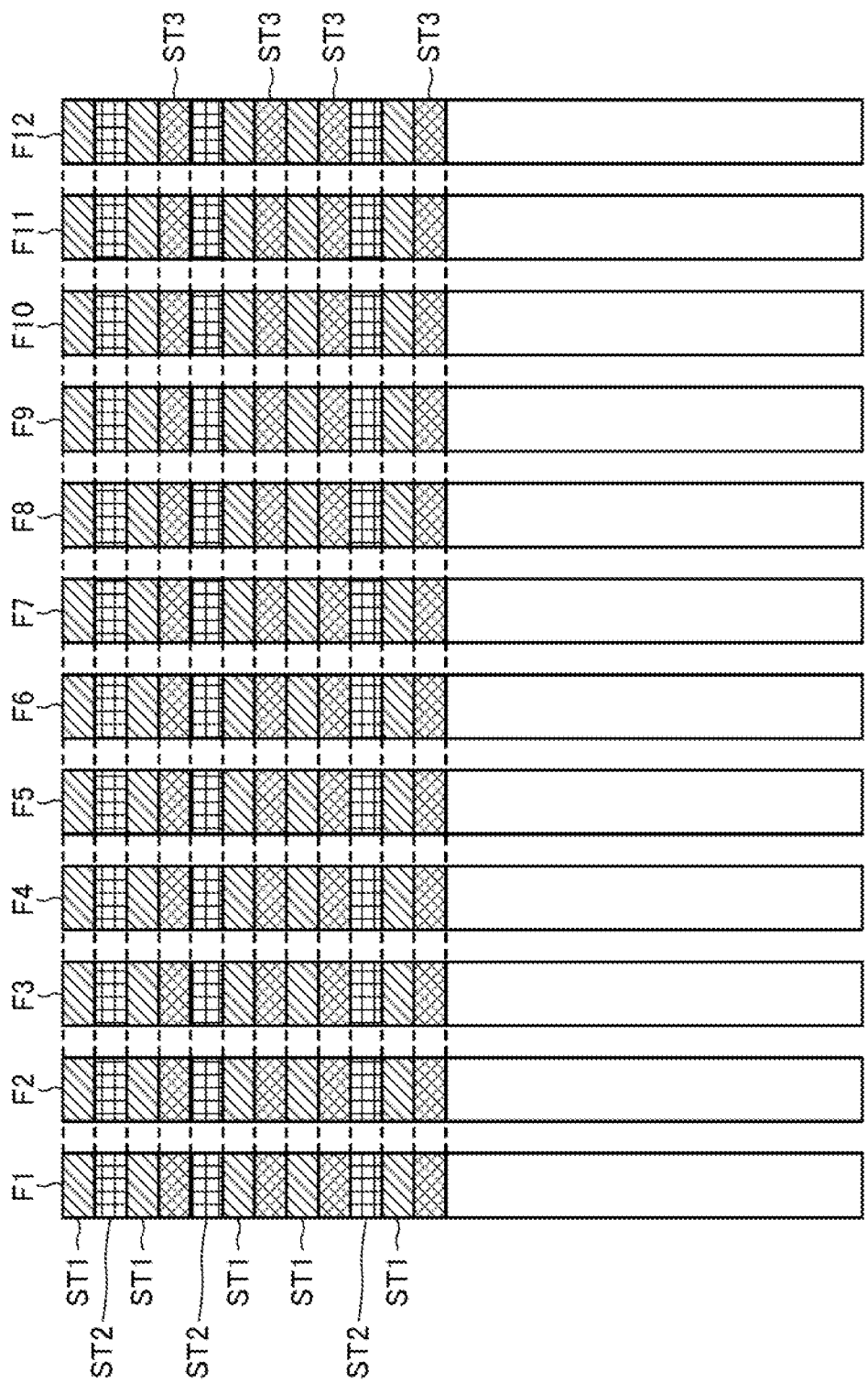
FIG. 11 is a view showing an aspect of storage of data into storage devices in the storage system disclosed in FIG. 10.

Here, in a case that fragment data are stored as described above, when a plurality of requests for storage of backup target data are simultaneously made, there is a possibility that fragment data composing respective data sets having different stream ID (ST1, ST2 and ST3) are alternately stored into the respective data storage files F1 to F12 as shown in FIG. 11. In FIG. 11, data sets having the same stream ID are illustrated by the same pattern.

Accordingly, the distribution storage control unit 24 in this exemplary embodiment once stores the respective fragment data D1 to D12 into buffer memories that are different by stream ID, before storing into the respective data storage files F1 to F12. After that, the distribution storage control unit 24 stores the fragment data D1 to D12 within the buffer memories into the respective data storage files F1 to F12. A specific example thereof will be described with reference to FIGS. 12 to 16.

Figure 12:
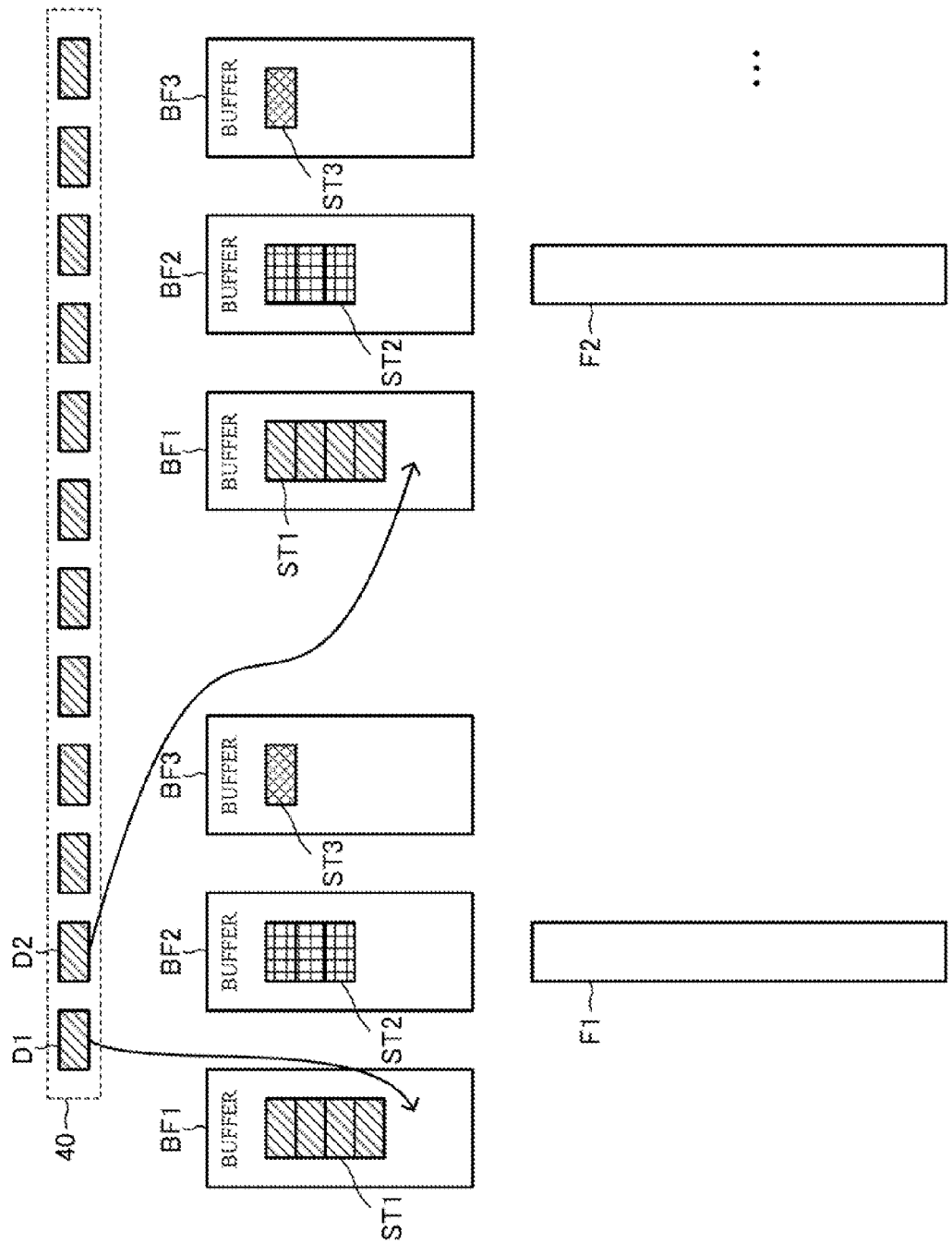
FIG. 12 is a view showing the aspect of storage of data into the storage devices in the storage system disclosed in FIG. 10.

First, the distribution storage control unit 24 sets up a buffer memory for each stream ID, for each of the data storage files F1 to F12. For example, in the case of setting up buffer memories BF1, BF2 and BF3 corresponding to the three stream ID (ST1, ST2 and ST3), as shown in FIG. 12, the distribution storage control unit 24 sets up the three buffer memories BF1, BF2 and BF3 for one data storage file F1, and sets up twelve sets of the buffer memories.

Then, the distribution storage control unit 24 stores the fragment data D1 to D12, respectively, into the buffer memories BF1, BF2 or BF3 corresponding to the stream ID included in the fragment data D1 to D12. In the example shown in FIG. 12, it is assumed that the data set 40 of the original block data D (backup target data A) is provided with the stream ID=ST1. In this case, the distribution storage control unit 24 stores the fragment data D1 to D12 composing the data set 40, into the buffer memories BF1 corresponding to the stream ID=ST1 set up for the respective data storage files F1 to F12 that become storage destinations later. In other words, the distribution storage control unit 24 stores the fragment data D1 into the buffer memory BF1 of the data storage file F1, stores the fragment data D2 into the buffer memory BF1 of the data storage file F2 and, in a like manner, stores the fragment data into the buffer memories of all of the data storage files. At this moment, the distribution storage control unit 24 stores the respective fragment data D1 to D12 into vacant storing regions next to data having already been stored within the respective buffer memories BF1 at the same time.

Consequently, within the respective buffer memories BF1 to BF3, fragment data provided with corresponding stream ID are successively positioned and stored. Moreover, at this moment, the respective fragment data D1 to D12 composing the same data set are stored in the same positions within the respective buffer memories BF1, BF2 or BF3. For example, in a case that the distribution storage control unit 24 stores the fragment data D1 and D2 of the data set 40 into the respective buffer memories BF1 as shown in FIG. 12, the fragment data D1 and D2 are stored in last storing positions that are the same positions within the buffer memories BF1 as shown in FIG. 13. By thus distributing fragment data by stream ID and storing into the respective buffer memories corresponding to the stream ID, all the capacities of the buffer memories for specific stream ID corresponding to all of the data storage files F1 to F12 become the same at any time. In the example of FIG. 13, the capacities of all of the buffer memories BF1 are the same, and also, the capacities of all of the buffer memories BF2 and BF3 are the same for each corresponding stream ID.

Then, the distribution storage control unit 24 stores all of the fragment data within the buffer memories BF1 to BF3 into the data storage files F1 to F12 at a time that the buffer memories BF1 to BF3 reach predetermined capacities, for example, become full. In the example of FIG. 13, all of the buffer memories BF1 corresponding to the stream ID=ST1 become full at the same time, and therefore, the distribution storage control unit 24 stores the fragment data within the buffer memories BF1 into the respective data storage files F1 to F12 at the same time. At this moment, the distribution storage control unit 24 stores the fragment data D1 to D12, respectively, in vacant storing positions next to data having already been stored in the data storage files F1 to F12. An example of FIG. 14 shows an aspect of storing fragment data from the beginnings of the respective data storage files F1 to F12 in a case that the respective data storage files F1 to F12 are vacant.

As shown in FIG. 14, in the respective data storage files F1 to F12, the respective fragment data D1 to D12 composing the same data set 40 are stored so that the storing positions thereof coincide. At this moment, data sets provided with the same stream ID are successively stored. FIG. 15 shows an aspect that the buffer memories BF2 corresponding to the other stream ID (ST2) thereafter become full and fragment data within the buffer memories BF2 are stored into the data storage files F1 to F12.

Further, the distribution storage control unit 24 in this exemplary embodiment also has a function of executing ex-post change of storing positions on not only fragment data to be stored into the data storage files as mentioned above but also fragment data having already been stored so that fragment data having the same stream ID are successively positioned. For example, when the available resource of the storage system 10 is a predetermined value or more, the distribution storage control unit 24 moves the storing positions of the fragment data stored in the respective data storage files F1 to F12 so that fragment data having the same stream ID are successively positioned. To be specific, the distribution storage control unit 24 can execute change of the storing positions of all fragment data stored in the same storing positions (horizontally aligned) in the respective data storage files F1 to F12 as shown in FIG. 11, on the whole data set 40 composed of the fragment data. Consequently, the distribution storage control unit 24 can change from a state that data sets having different stream ID are alternately stored as shown in FIG. 11 to a state that data sets having the same stream ID (ST1, ST2, ST3) are successively stored as shown in FIG. 16. The other functions of the distribution storage control unit 24 are almost the same as in the first exemplary embodiment.

In the above description, when dividing the block data D to generate the data set 40, the fragment generation unit 23 provides the same stream ID to the respective fragment data D1 to D12 composing the data set 40, but there is no need to provide to the respective fragment data D1 to D12 necessarily. For example, by storing the fragment data D1 to D12 composing the data sets 40 generated from the respective block data D into the data buffers BF1 to BF3 corresponding to the stream ID provided to the respective block data D, it is possible to successively store the fragment data by stream ID. Since the respective fragment data D1 to D12 composing the same data set 40 are stored in the same storing positions within the buffer memories BF1, BF2, BF3 and within the data storage files F1 to F12, it is possible to change the storing positions of all of the fragment data in the same storing positions together to change the storing positions by data set.

Further, as in the first exemplary embodiment described above, the storing position management unit 25 manages the storing position of data by a content address CA. A description thereof will be omitted.

[Operation]

Next, an operation of the storage system described above will be described with reference to a flowchart of FIG. 17.

Here, an operation by the storage system 10 of accepting backup target data from a predetermined backup target device 12 via the backup system 11 and storing the backup target data into the storage devices 31 will be described (a data storage process). A description of an operation similar to that of the exemplary embodiment described above will be omitted.

Firstly, upon acceptance of an input of the backup target data A, the storage system 10, namely, the accelerator node 10A provides stream ID that is identification information distinguishing the backup target data A as a group of data (step S11, an identification information providing step).

Then, the accelerator node 10A divides the backup target data A into predetermined capacities (e.g., 64 KB) of block data D (step S12). Based on the data content of this block data D, the accelerator node 10A calculates a unique hash value H (content identification information) representing the data content (step S13). Then, it is checked whether or not this hash value H is registered in the MFI file. In a case that the hash value H is registered, a content address CA related with the hash value H of the block data D within the MFI file is returned to the file system as the storing position of this block data D. On the other hand, in a case that the hash value of the block data D is not registered in the MFI file, a process of storing the block data D is executed.

When backup target data A is divided into block data D as described above, stream ID provided to the backup target data A as described above is provided to the respective block data D as well.

Subsequently, after compressing the block data D, the storage node 10B divides into, for example, nine fragment data (step S14) and adds, for example, three redundant data to the fragment data. Then, the storage node 10B generates a data set including twelve pieces of fragment data composed of the nine division data and the three redundant data (step S15, a data set generating step). Subsequently, the storage node 10B provides ID for identifying the data set to the respective fragments (step S16).

Then, the storage node 10B sets up a buffer memory for each stream ID, for each of the data storage files F1 to F12. Then, the storage node 10B stores the respective fragment data D1 to D12 into the buffer memories BF1, BF2, BF3 corresponding to the stream ID included in the fragment data D1 to D12 (step S17). At this moment, the storage node 10B stores the respective fragment data D1 to D12 in vacant storing regions next to data having already been stored within the respective buffer memories BF1 to BF3 at the same time on the whole.

Consequently, within the respective buffer memories BF1, BF2 and BF3, fragment data provided with corresponding stream ID are successively positioned and stored. Moreover, at this moment, the respective fragment data D1 to D12 composing the same data set are stored in the same storing positions within the buffer memories BF1, BF2, BF3.

After that, at a time that the buffer memories BF1, BF2, BF3 reach predetermined capacities, for example, become full ("Yes" at step S18), the storage node 10B stores the fragment data within the buffer memories BF1, BF2, BF3 into the data storage files F1 to F12 (step S19, a distribution storage controlling step). At this moment, the storage node 10B stores the fragment data D1 to D12, respectively, in vacant storing positions next to data having been stored in the respective data storage files F1 to F12. The time to store fragment data from the buffer memories into the data storage files is not limited to the abovementioned time necessarily. For example, the abovementioned step may be executed at a time after a set time period has elapsed from a certain reference time.

Thus, the storage node 10B can store all of the fragment data D1 to D12 composing the one data set 40 in the same positions within the respective data storage files F1 to F12. Moreover, consequently, data provided with the same stream ID are successively stored within the respective data storage files F1 to F12.

Then, the storage node 10B combines part (beginning 8B) of the hash value H calculated based on the content of the stored block data D with information representing a logical storing position, thereby generating a content address CA that represents the storing positions of the fragment data D1 to D12 stored in the storage devices 31. Then, the storage node 10B returns this content address CA to the accelerator node 10A. Then, the accelerator node 10A relates the returned content address CA with the file name of the actually stored backup target data, and so on, and manages in the file system.

Further, the storage node 10B relates the generated content address CA of the block data D with the hash value H of the block data D, and manages in the MFI file. As mentioned above, the MFI file that manages the hash value H and the content address CA is used for checking whether or not data of the same content has already been stored, when newly storing backup target data.

After that, at any time, for example, when the available resource of the storage system 10 is a predetermined or more ("Yes" at step S20), a process of ex-post change of the storing positions is executed on fragment data having already been stored so that fragment data provided with the same stream ID are successively positioned (step S21). In this process, stream ID within the respective fragment data stored in the same storing positions of the respective storage files F1 to F2 are checked, and the storing positions of the fragment data are changed so that the storing positions of more fragment data provided with the same stream ID, that is, the storing positions of more data sets become successive.

Thus, according to the storage system 10 of this exemplary embodiment, at the time of retrieval of stored data, by specifying the storing position of one fragment data of a data set composing the data, it is possible to easily specify the storing positions of the other fragment data. Moreover, since a plurality of storage target data composing a group of data are successively stored, data of related contents are stored together. Therefore, when retrieving data stored in the storage system, it is possible to retrieve the related data together. As a result, it is possible to increase of the speed and efficiency of data retrieval, and it is possible to increase the performance of the storage system.

Third Exemplary Embodiment

A third exemplary embodiment of the present invention will be described with reference to FIG. 18. FIG. 18 is a function block diagram showing a configuration of a storage system. In this exemplary embodiment, the storage system will be schematically described.

As shown in FIG. 18, a storage system 1 of this exemplary embodiment is equipped with a plurality of storing means 5 and a data processing means 2 configured to store data into the plurality of storing means 5 and retrieve the data stored in the storing means 5.

Then, the data processing means 2 includes: a data set generating means 3 configured to generate division data by dividing storage target data into a plurality of pieces and also generate redundant data for restoring the storage target data, thereby generating a data set composed of a plurality of fragment data that are the division data and the redundant data; and a distribution storage controlling means 4 configured to distribute and store the fragment data into the respective storing means.

Furthermore, the distribution storage controlling means 4 is configured to store the fragment data composing the data set in same positions within storage regions formed in the respective storing means, respectively.

Further, the distribution storage controlling means is configured to store the fragment data composing the data set in same positions with respect to beginnings of data storing regions of files generated in the respective storing means, respectively.

According to the invention described above, firstly, the storage system accepts storage target data in response to a data storage request from a host. Then, the storage system divides the storage target data into a plurality of division data and also generates redundant data for restoring the storage target data, and generates a data set including a plurality of fragment data that are the division data and the redundant data. Subsequently, the storage system distributes and stores the fragment data composing the one data set into the respective storing means. At this moment, the storage system stores the fragment data composing the one data set in the same positions within the storage regions formed in the respective storing means, for example, in the same positions from the beginnings of data storing regions of respective files.

Thus, at the time of retrieval of stored data, the storage system specifies the storing position of one fragment data of a data set composing the data, thereby being capable of easily specifying the storing positions of the other fragment data. Therefore, at the time of retrieval of the data, there is no need to specify the positions of all of the fragments composing the data set, and it is possible to retrieve the data at high speeds. As a result, it is possible to realize a high-performance storage system capable of retrieving data at high speeds while maintaining redundancy.

Further, in the storage system, the distribution storage controlling means is configured to store the fragment data composing the data set in vacant storing positions next to data having already been stored in files generated in the respective storing means.

Further, in the storage system, the distribution storage controlling means is configured to store the fragment data composing the data set into the respective storing means at a same time.

As mentioned above, the distribution storage controlling means stores the fragment data into the respective storing means, whereby it is possible to store the fragment data composing the data set in the same positions, respectively, by a simple process. Therefore, it is also possible to increase the speed of a data storage process.

Further, in the storage system, the distribution storage controlling means is configured to provide same identification information for identifying the data set to the respective fragment data composing the data set, and store the fragment data composing the data set into the respective storing means.

Further, in the storage system, the distribution storage controlling unit is configured to check whether or not the fragment data composing the data set are stored in the same positions within the storage regions formed in the respective storing means, respectively, based on the identification information provided to the respective fragment data and, in a case that the fragment data are not stored in the same positions within the respective storage regions, change storing positions of the fragment data so that the fragment data composing the data set are stored in the same positions within the respective storage regions, respectively.

Thus, the respective fragment data composing a data set are provided with the same identification information and stored into the plurality of storing means. Therefore, by checking the identification information provided to the already stored fragment data, it is possible to determine whether or not the respective fragment data composing one data set are stored in the same positions of the respective storing means. Then, based on the identification information included in the respective fragment data, it is possible to change the storing positions of the fragment data stored in the respective storing means. As a result, as described above, it is possible to store fragment data composing one data set in the same positions within the storage regions formed within the respective storing means, respectively, and it becomes possible to retrieve data at high speeds.

Further, in the storage system: the data processing means includes a storing position information managing means configured to generate and manage storing position information representing storing positions of the storage target data stored into the respective storing means by the distribution storage controlling means; and the storing position information managing means is configured to, based on the storing position information of data specified when retrieval of the data is requested, retrieve data stored in the storing positions within the respective storing means represented by the storing position information.

Further, in the storage system: the data processing means includes a duplication checking means configured to generate content identification information that is unique to a content of the storage target data, and compare with content identification information that is unique to contents of the storage target data having already been stored in the respective storing means, thereby checking whether or not the storage target data having a same content is stored in the respective storing means; and the duplication checking means is configured to, in a case that data having a same content as the storage target data is already stored in the respective storing means, use storing position information of the data having the same content, as the storing position information of the storage target data, without storing the storage target data into the respective storing means.

Thus, it is possible to apply the abovementioned configuration to a content address storage system that specifies, based on the content of storage target data, storing position information representing a position in which the data is stored. Therefore, it is possible to inhibit duplicate storage of storage target data having the same content as already stored data, it is possible to reduce the use amount of data storage, and it is possible to decrease the cost of the system.

Further, in the storage system, the data processing means is equipped with an identification information providing means configured to provide identification information distinguishing a group of data requested to be stored, to the group of data.

Then, the distribution storage controlling means is configured to store the fragment data composing each of a plurality of data sets corresponding to a plurality of storage target data included in the group of data provided with the same identification information, into the respective storage regions so that storing positions within the respective storage regions become successive.

Thus, since a plurality of storage target data composing a group of data are successively stored in the storing means, data having related contents are stored together. Therefore, when retrieving stored data, the storage system can retrieve related data together. As a result, it is possible to increase the speed and efficiency of data retrieval, and it is possible to increase the performance of the storage system.

Further, in the storage system, the distribution storage controlling means is configured to store the fragment data composing each of the plurality of data sets corresponding to the plurality of storage target data included in the group of data provided with the same identification information before being stored into the storing means, so that storing positions within buffer memories become successive, and store the fragment data stored in the buffer memories into the respective storing means.

Further, in the storage system, the distribution storage controlling means is configured to store the fragment data composing each of the plurality of data sets corresponding to the plurality of storage target data included in the group of data provided with the same identification information, into the buffer memories that are different by identification information, and store the fragment data stored in the respective buffer memories set up for each identification information, into the respective storing means.

Further, in the storage system, the distribution storage controlling means is configured to store the fragment data stored in the buffer memories into the respective storing means at a time that the buffer memories reach predetermined capacities.

Thus, the storage system once stores a group of data into a buffer memory so as to be successive, and thereafter stores into the storing means. Therefore, a process of storing data having related content together becomes easy, and it is possible to increase the performance of the storage system.

Further, in the storage system, the distribution storage controlling means is configured to re-store the fragment data composing each of the plurality of data sets corresponding to the plurality of storage target data included in the group of data provided with the same identification information, the fragment data having already been stored in the respective storing means, into the respective storage regions so that storing positions within the respective storage regions become successive.

Thus, the storage system also re-stores data having already been stored in the storing means so that storage target data composing a group of data become successive. Therefore, it is possible to increase the speed and efficiency of data retrieval after that.

Further, in the storage system, the data set generating means is configured to include the identification information provided to the group of data by the identification information providing means, into the respective fragment data composing each of the data sets corresponding to the plurality of storage target data included in the group of data.

Thus, it is possible to easily grasp what group of data the fragment data stored in the respective storage regions belong to. Therefore, based on identification information included in the respective fragment data, it is possible to easily execute a process of successively storing storage target data included in a group of data.

Further, the storage system can be realized by building in a computer program into an information processing device (system).

To be specific, a computer program of another embodiment of the present invention is a computer program that includes instructions for causing an information processing device equipped with a plurality of storing means to realize a data processing means configured to store data into the plurality of storing means and retrieve the data stored in the storing means.

Then, the data processing means includes: a data set generating means configured to generate division data by dividing storage target data into a plurality of pieces and also generate redundant data for restoring the storage target data, thereby generating a data set composed of a plurality of fragment data that are the division data and the redundant data; and a distribution storage controlling means configured to distribute and store the fragment data into the respective storing means.

Furthermore, the distribution storage controlling means is configured to store the fragment data composing the data set in same positions within storage regions formed in the respective storing means, respectively.

Further, in the computer program, the distribution storage controlling means is configured to store the fragment data composing the data set in same positions with respect to beginnings of data storing regions of files generated in the respective storing means, respectively.

Further, in a data processing method of another exemplary embodiment of the present invention executed by operation of the storage system, an information processing device equipped with a plurality of storing means stores data into the plurality of storing means and retrieves the data stored in the storing means.

Then, at the time of storing data into the plurality of storing means, the information processing device: generates division data by dividing storage target data into a plurality of pieces, and also generates redundant data for restoring the storage target data, thereby generating a data set composed of a plurality of fragment data that are the division data and the redundant data; and distributes and stores the fragment data into the respective storing means.

Furthermore, at the time of storing the fragment data into the respective storing means, the information processing device stores the fragment data composing the data set in same positions within storage regions formed in the respective storing means, respectively.

Further, the data processing method includes storing the fragment data composing the data set in same positions with respect to beginnings of data storing regions of files generated in the respective storing means, respectively, at the time of storing the fragment data into the respective storing means.

Inventions of a computer program and a data processing method having the abovementioned configurations have like actions as the abovementioned storage system, and therefore, can achieve the object of the present invention mentioned above.

Although the present invention has been described with reference to the respective exemplary embodiments described above, the present invention is not limited to the abovementioned exemplary embodiments. The configuration and details of the present invention can be altered within the scope of the present invention in various manners that can be understood by those skilled in the art.

INDUSTRIAL APPLICABILITY

The present invention can be utilized for a storage system configured by connecting a plurality of computers, and has industrial applicability.

DESCRIPTION OF REFERENCE NUMERALS 1 storage system
2 data processing means
3 identification information providing means
4 data set generating means
5 distribution storage controlling means
6 storing means
10 storage system 10A accelerator node
10B storage node
11 backup system
12 backup target device
20 data processing device
21 block generation unit
22 duplication check unit
23 fragment generation unit
24 distribution storage control unit
25 storing position management unit
26 stream ID provision unit
30 data storage device
31 storage device
32 storing position storage unit
40 data set
41 division data
42 redundant data
A backup target data
BF1, BF2, BF3 buffer memories
CA content address
D block data
D1 to D12 fragment data
F1 to F12 data storage file
H hash value

The invention claimed is:

1. A storage system comprising a plurality of storing units and a data processing unit configured to store data into the plurality of storing units and retrieve the data stored in the storing units, wherein:
the data processing unit includes:
a data set generating unit configured to generate division data by dividing storage target data into a plurality of pieces and also generate redundant data for restoring the storage target data, thereby generating a data set composed of a plurality of fragment data that are the division data and the redundant data; and
a distribution storage controlling unit configured to distribute and store the fragment data into the respective storing units; and
the distribution storage controlling unit is configured to:
store the fragment data composing the data set in same positions within storage regions formed in the respective storing units, respectively;
provide same identification information for identifying the data set to the respective fragment data comprising the data set, and store the fragment data composing the data set into the respective storing units; and
check whether or not the fragment data composing the data set are stored in the same positions within the storage regions formed in the respective storing units, respectively, based on the identification information provided to the respective fragment data and, when the fragment data are not stored in the same positions within the respective storage regions, change storing positions of the fragment data so that the fragment data of the data set are stored in the same positions within the respective storage regions, respectively.

2. The storage system according to claim 1, wherein:
the distribution storage controlling unit is configured to store the fragment data composing the data set in same positions with respect to beginnings of data storing regions of files generated in the respective storing units, respectively.

3. The storage system according to claim 1, wherein:
the distribution storage controlling unit is configured to store the fragment data composing the data set in vacant storing positions next to data having already been stored in files generated in the respective storing units.

4. The storage system according to claim 1, wherein:
the distribution storage controlling unit is configured to store the fragment data composing the data set into the respective storing units at a same time.

5. The storage system according to claim 1, wherein:
the data processing unit includes a storing position information managing unit configured to generate and manage storing position information representing storing positions of the storage target data stored into the respective storing units by the distribution storage controlling units; and
the storing position information managing unit is configured to, based on the storing position information of data specified when retrieval of the data is requested, retrieve data stored in the storing positions within the respective storing units represented by the storing position information.

6. The storage system according to claim 5, wherein:
the data processing unit includes a duplication checking unit configured to generate content identification information that is unique to a content of the storage target data, and compare with content identification information that is unique to contents of the storage target data having already been stored in the respective storing units, thereby checking whether or not the storage target data having a same content is stored in the respective storing units; and
the duplication checking unit is configured to, in a case that data having a same content as the storage target data is already stored in the respective storing units, use storing position information of the data having the same content, as the storing position information of the storage target data, without storing the storage target data into the respective storing units.

7. A non-transitory computer-readable storage medium that stores a program comprising instructions for causing an information processing device equipped with a plurality of storing units to realize a data processing unit configured to store data into the plurality of storing units and retrieve the data stored in the storing units, wherein:
the data processing unit includes:
a data set generating unit configured to generate division data by dividing storage target data into a plurality of pieces and also generate redundant data for restoring the storage target data, thereby generating a data set composed of a plurality of fragment data that are the division data and the redundant data; and
a distribution storage controlling unit configured to distribute and store the fragment data into the respective storing units; and
the distribution storage controlling unit is configured to:
store the fragment data composing the data set in same positions within storage regions formed in the respective storing units, respectively;
provide same identification information for identifying the data set to the respective fragment data comprising the data set, and store the fragment data composing the data set into the respective storing units; and
check whether or not the fragment data composing the data set are stored in the same positions within the storage regions formed in the respective storing units, respectively, based on the identification information provided to the respective fragment data and, when the fragment data are not stored in the same positions within the respective storage regions, change storing positions of the fragment data so that the fragment data of the data set are stored in the same positions within the respective storage regions, respectively.

8. The non-transitory computer-readable storage medium that stores the program according to claim 7, wherein:
the distribution storage controlling unit is configured to store the fragment data composing the data set in same positions with respect to beginnings of data storing regions of files generated in the respective storing units, respectively.

9. A data processing method comprising, by an information processing device equipped with a plurality of storing units:
storing data into the plurality of storing units and retrieving the data stored in the storing units; and
at the time of storing data into the plurality of storing units:
generating division data by dividing storage target data into a plurality of pieces and also generating redundant data for restoring the storage target data, thereby generating a data set composed of a plurality of fragment data that are the division data and the redundant data; and
distributing and storing the fragment data into the respective storing units; and
at the time of storing the fragment data into the respective storing units:
storing the fragment data composing the data set in same positions within storage regions formed in the respective storing units, respectively;
providing same identification information for identifying the data set to the respective fragment data comprising the data set, and store the fragment data composing the data set into the respective storing units; and
checking whether or not the fragment data composing the data set are stored in the same positions within the storage regions formed in the respective storing units, respectively, based on the identification information provided to the respective fragment data and, when the fragment data are not stored in the same positions within the respective storage regions, change storing positions of the fragment data so that the fragment data of the data set are stored in the same positions within the respective storage regions, respectively.

10. The data processing method according to claim 9 comprising, at the time of storing the fragment data into the respective storing units, storing the fragment data composing the data set in same positions with respect to beginnings of data storing regions of files generated in the respective storing units, respectively.

* * * * *